(12) United States Patent
Kim et al.

(10) Patent No.: US 12,405,636 B2
(45) Date of Patent: *Sep. 2, 2025

(54) ELECTRONIC DEVICE COMPRISING HALL SENSOR FOR IDENTIFYING FOLDING STATE

(71) Applicant: SAMSUNG ELECTRONICS CO., LTD., Suwon-si (KR)

(72) Inventors: Youngjae Kim, Gyeonggi-do (KR); Woosung Chun, Gyeonggi-do (KR); Changkwan Yang, Gyeonggi-do (KR); Kwanghee Ryu, Gyeonggi-do (KR); Hyunju Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,054

(22) Filed: May 3, 2024

(65) Prior Publication Data

US 2024/0281039 A1 Aug. 22, 2024

Related U.S. Application Data

(63) Continuation of application No. 17/837,388, filed on Jun. 10, 2022, now Pat. No. 11,977,419, which is a
(Continued)

(30) Foreign Application Priority Data

Aug. 10, 2021 (KR) .................. 10-2021-0105594

(51) Int. Cl.
*G06F 1/16* (2006.01)

(52) U.S. Cl.
CPC .......... *G06F 1/1677* (2013.01); *G06F 1/1616* (2013.01); *G06F 1/1652* (2013.01);
(Continued)

(58) Field of Classification Search
CPC ..... G06F 1/1616; G06F 1/1652; G06F 1/1677
See application file for complete search history.

(56) References Cited

U.S. PATENT DOCUMENTS 8,243,438 B2 8/2012 Wang
8,295,037 B1 10/2012 Buuck
(Continued)

FOREIGN PATENT DOCUMENTS

CN 110213413 A 9/2019
CN 110849257 A 2/2020
(Continued)

OTHER PUBLICATIONS

European Search Report dated Oct. 1, 2024 for EP Application No. 22855970.4.
(Continued)

*Primary Examiner* — Adrian S Wilson
(74) *Attorney, Agent, or Firm* — Nixon & Vanderhye P.C.

(57) ABSTRACT

An electronic device is disclosed, including: a first housing, a second housing, a folding housing that pivotably connects the first housing and second housing, a flexible display spanning the first, second and folding housings, a printed circuit board (PCB), a first camera module at least partly visible through a surface of the second housing, a first magnet disposed in the first housing, a second magnet disposed in the second housing, and a hall sensor disposed on the PCB, the hall sensor configured to detect magnetic flux caused by motion of the first and/or second magnet in folding and unfolding of the electronic device so as facilitate determination of a configuration state of the electronic device.

20 Claims, 21 Drawing Sheets

Related U.S. Application Data continuation of application No. PCT/KR2022/007070, filed on May 17, 2022.

(52) U.S. Cl.
CPC .......... *G06F 1/1681* (2013.01); *G06F 1/1686* (2013.01); *G06F 1/169* (2013.01); *G06F 1/1698* (2013.01)

(56) References Cited

U.S. PATENT DOCUMENTS

| | | | |
|---|---|---|---|
| 8,321,709 | B2 | 11/2012 | Jin |
| 8,624,695 | B2 | 1/2014 | Cretella et al. |
| 9,823,093 | B2 | 11/2017 | Kauhaniemi et al. |
| 10,024,689 | B2 | 7/2018 | Zhu |
| 10,063,677 | B2 | 8/2018 | Cavallaro |
| 10,073,668 | B2 | 9/2018 | Chun et al. |
| 10,338,642 | B2 | 7/2019 | Furlong |
| 10,338,643 | B2 | 7/2019 | Wu |
| 10,580,556 | B2 | 3/2020 | Lauder |
| 11,281,254 | B2 | 3/2022 | Lee et al. |
| 11,300,995 | B2 | 4/2022 | Eom et al. |
| 11,317,010 | B2 | 4/2022 | Aschwanden et al. |
| 11,510,328 | B2 | 11/2022 | Kim |
| 11,838,434 | B2 | 12/2023 | Lyu |
| 11,977,419 | B2 * | 5/2024 | Kim ...................... G06F 1/1658 |
| 2004/0227407 | A1 | 11/2004 | Nagai |
| 2014/0035872 | A1 | 2/2014 | Park |
| 2017/0357292 | A1 | 12/2017 | Cho |
| 2018/0181361 | A1 * | 6/2018 | Becze .............. B29D 11/00673 |
| 2020/0267861 | A1 | 8/2020 | Kim |
| 2021/0116962 | A1 | 4/2021 | Lee |
| 2021/0409521 | A1 | 12/2021 | Shim et al. |
| 2021/0409531 | A1 | 12/2021 | Shim et al. |
| 2021/0409532 | A1 | 12/2021 | Lee |
| 2022/0086268 | A1 * | 3/2022 | Lyu ........................... G06T 7/55 |

FOREIGN PATENT DOCUMENTS

| | | |
|---|---|---|
| JP | 4304871 B2 | 5/2009 |
| KR | 10-0442625 B1 | 7/2004 |
| KR | 20-0367900 Y1 | 11/2004 |
| KR | 10-0628765 B1 | 9/2006 |
| KR | 10-2008-0025881 A | 3/2008 |
| KR | 10-2018-0118720 A | 10/2018 |
| KR | 10-2020-0101791 A | 8/2020 |
| KR | 10-2020-0126315 A | 11/2020 |
| KR | 10-2021-0045668 A | 4/2021 |
| WO | WO 2020/238506 A1 | 12/2020 |
| WO | WO2020/256168 A1 | 12/2020 |

OTHER PUBLICATIONS

KR Notification of the Reasons for Rejection dated Oct. 16, 2024 for KR Application No. 10-2021-0105594.
U.S. Appl. No. 17/837,388, filed Jun. 10, 2022; KIM et al.
International Search Report dated Aug. 18, 2022.
PCT International Patent Publication dated Dec. 24, 2020.
English Translation of International Search Report dated Aug. 18, 2022.

* cited by examiner

ELECTRONIC DEVICE COMPRISING HALL SENSOR FOR IDENTIFYING FOLDING STATE

CROSS-REFERENCE TO RELATED APPLICATION(S)

This application is based on and claims priority under 35 U.S.C. § 120 to PCT International Application No. PCT/KR2022/007070, which was filed on May 17, 2021, and claims priority to Korean Patent Application No. 10-2021-0105594, filed on Aug. 10, 2021, the disclosures of which are incorporated by reference herein their entirety.

BACKGROUND

Technical Field

The following descriptions relate to an electronic device comprising a hall sensor for identifying a folding state.

Description of Related Art

An electronic device including a flexible display panel has been developed. The electronic device may provide a folding state (e.g., completely folding), an unfolding state (e.g., completely unfolded), an intermediate state between the folding state and the unfolding state through the flexible display panel. The electronic device may provide a wider screen in the unfolding state, provide enhanced portability in the folding state, and provide various user experiences in the intermediate state.

The electronic device may include a flexible display panel, and may provide various states (e.g., a folding state, an unfolding state, or an intermediate state) through the flexible display panel. The electronic device may include a plurality of magnets to maintain the folding state or to identify the folding state. In order to provide different functions according to the various states, the electronic device may include a hall sensor that identifies the various states using a magnetic field from at least some of the plurality of magnets.

Meanwhile, since the magnetic field from the plurality of magnets may affect the performance of components included in the electronic device, it may be required in the electronic device to mount the hall sensor in a position capable of reducing the number of magnets.

The technical problems to be achieved in this document are not limited to those described above, and other technical problems not mentioned herein will be clearly understood by those having ordinary knowledge in the art to which the present disclosure belongs, from the following description.

SUMMARY

According to an embodiment, an electronic device may comprise a first housing comprising a first surface and a second surface faced away the first surface; a second housing comprising a third surface and a fourth surface faced away the third surface; a folding housing pivotably connecting a side surface of the first housing and a side surface of the second housing facing the side surface of the first housing based on a folding axis; a flexible display panel disposed on the first surface and the third surface across the folding housing; a printed circuit board (PCB) in the first housing; a camera module, comprising a magnet, attached to the PCB, the camera module at least partially exposed through a portion of the second surface; a first magnet in the first housing disposed along a periphery of the first surface spaced apart from the folding axis from among peripheries of the first surface parallel to the folding axis; a second magnet in the second housing disposed in a position corresponding to a position of the first magnet; and a hall sensor, disposed between a periphery of the first surface adjacent to the first magnet from among peripheries of the first surface perpendicular to the folding axis and the camera module, mounted on the PCB.

According to an embodiment, an electronic device may comprise a first housing comprising a first surface and a second surface faced away the first surface; a second housing comprising a third surface and a fourth surface faced away the third surface; a folding housing pivotably connecting a side surface of the first housing and a side surface of the second housing facing the side surface of the first housing based on a folding axis; a flexible display panel disposed on the first surface and the third surface across the folding housing; a first magnet in the first housing disposed along a periphery of the first surface spaced apart from the folding axis from among peripheries of the first surface parallel to the folding axis; a second magnet in the second housing disposed in a position corresponding to a position of the first magnet; a plurality of antenna contacts, adjacent to the periphery that is adjacent to the first magnet from among the peripheries of the first surface perpendicular to the folding axis, attached to the PCB along a periphery of the PCB, spaced apart from each other; and a hall sensor, mounted on the PCB, spaced apart from each of the plurality of antenna contacts, spaced apart from the first magnet.

According to an embodiment, an electronic device may comprise a first housing comprising a first surface and a second surface faced away the first surface; a second housing comprising a third surface and a fourth surface faced away the third surface; a folding housing pivotably connecting a side surface of the first housing and a side surface of the second housing facing the side surface of the first housing based on a folding axis; a flexible display panel disposed on the first surface and the third surface across the folding housing; a camera module, comprising a magnet, attached to the first PCB in the first housing, a second PCB in the second housing, and the first PCB, the camera module at least partially exposed through a portion of the second surface; a first magnet in the first housing disposed along a periphery of the first surface spaced apart from the folding axis from among peripheries of the first surface parallel to the folding axis; a second magnet in the second housing disposed in a position corresponding to a position of the first magnet; a plurality of antenna contacts attached to the second PCB along an periphery of the second PCB, adjacent to an periphery adjacent to the second magnet among periphery of the third surface perpendicular to the folding shaft, spaced apart from each other; and a hall sensor, mounted on the second PCB, spaced apart from each of the plurality of antenna contacts, spaced apart from the second magnet.

DETAILED DESCRIPTION

Figure 1:
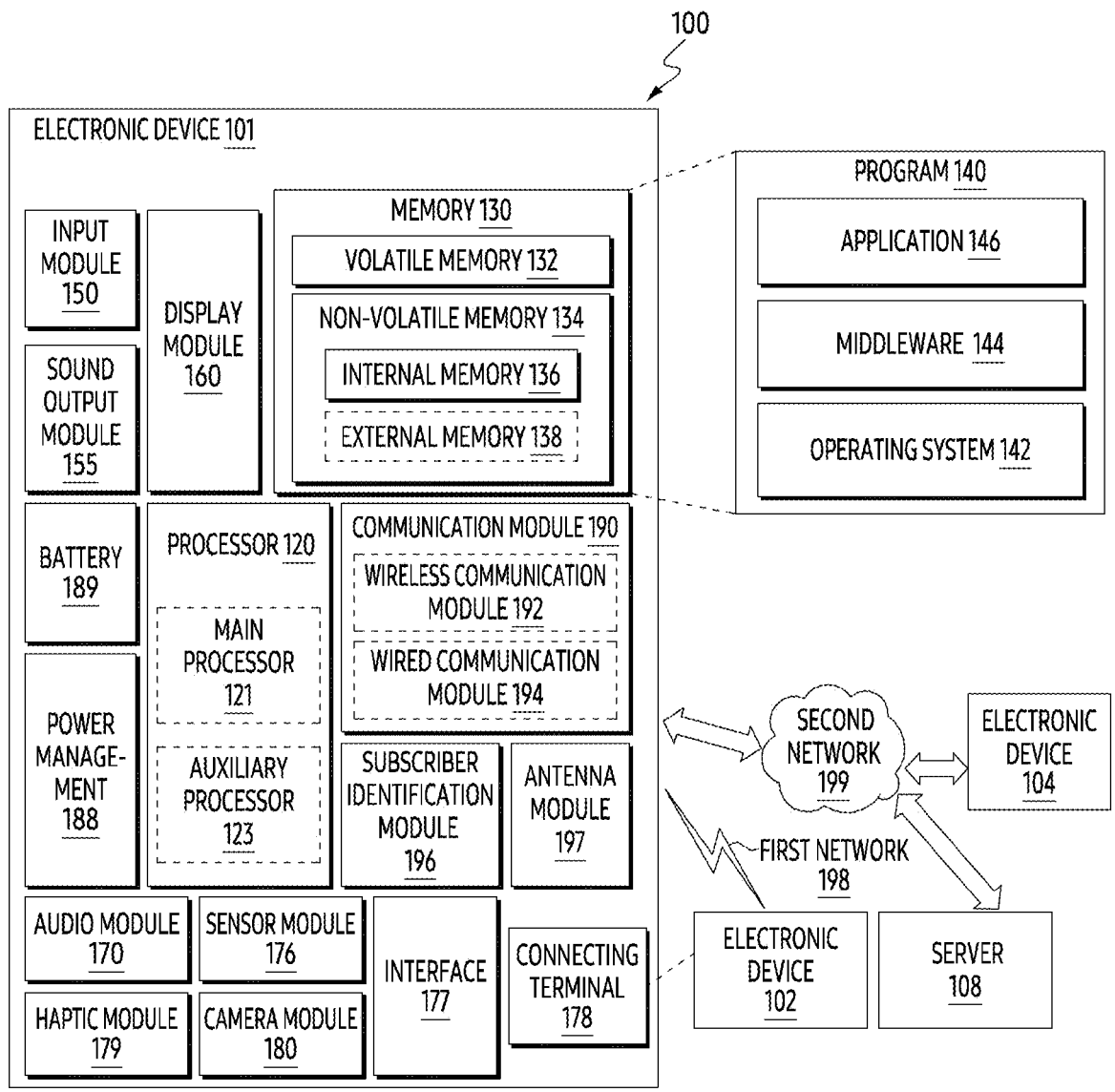
FIG. 1 is a block diagram of an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
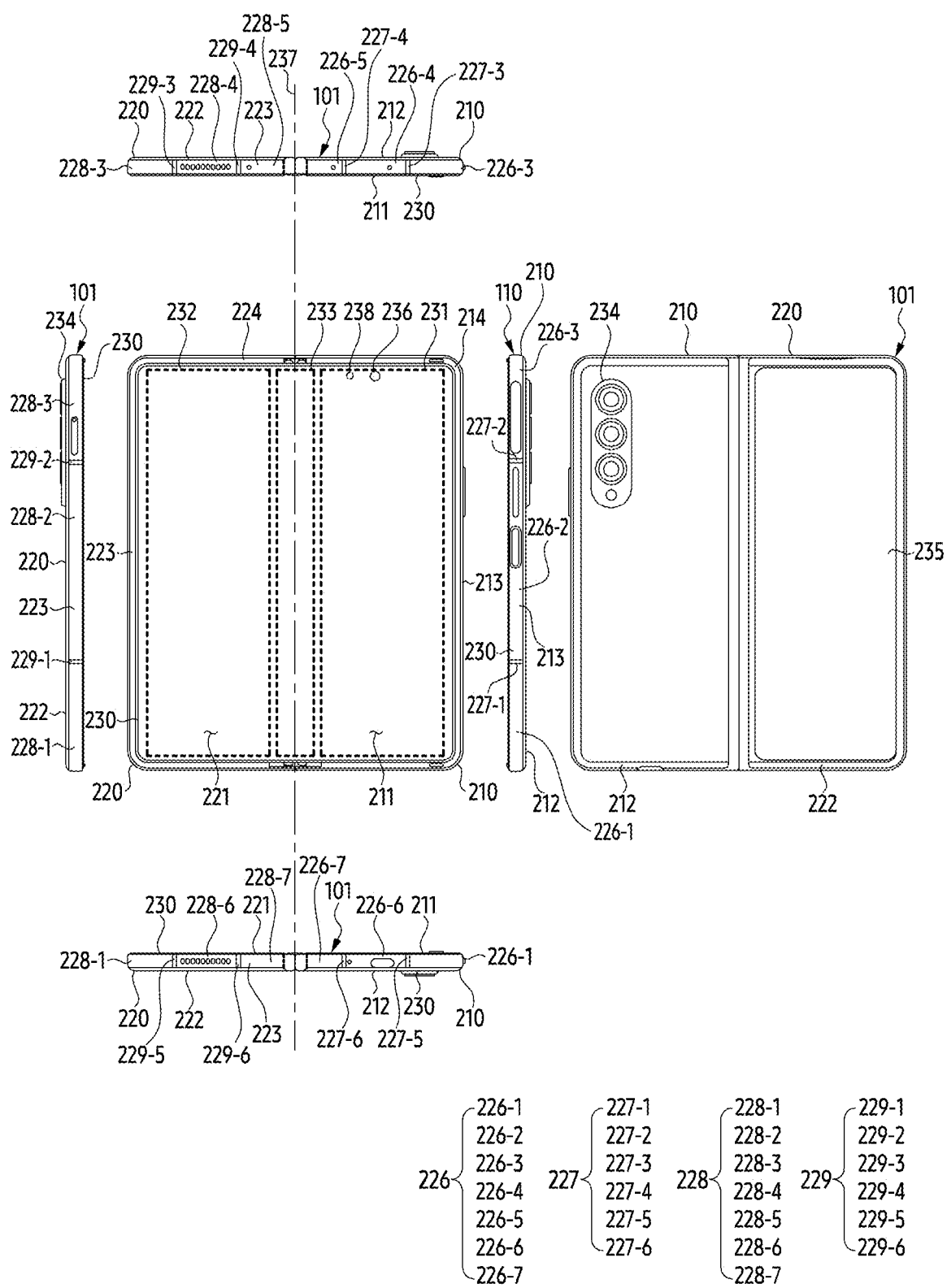
FIG. 2A illustrates an example of an unfolding state of an electronic device according to an embodiment.

FIG. 2A illustrates an example of an unfolding state of an electronic device according to an embodiment.

Figure 2B:
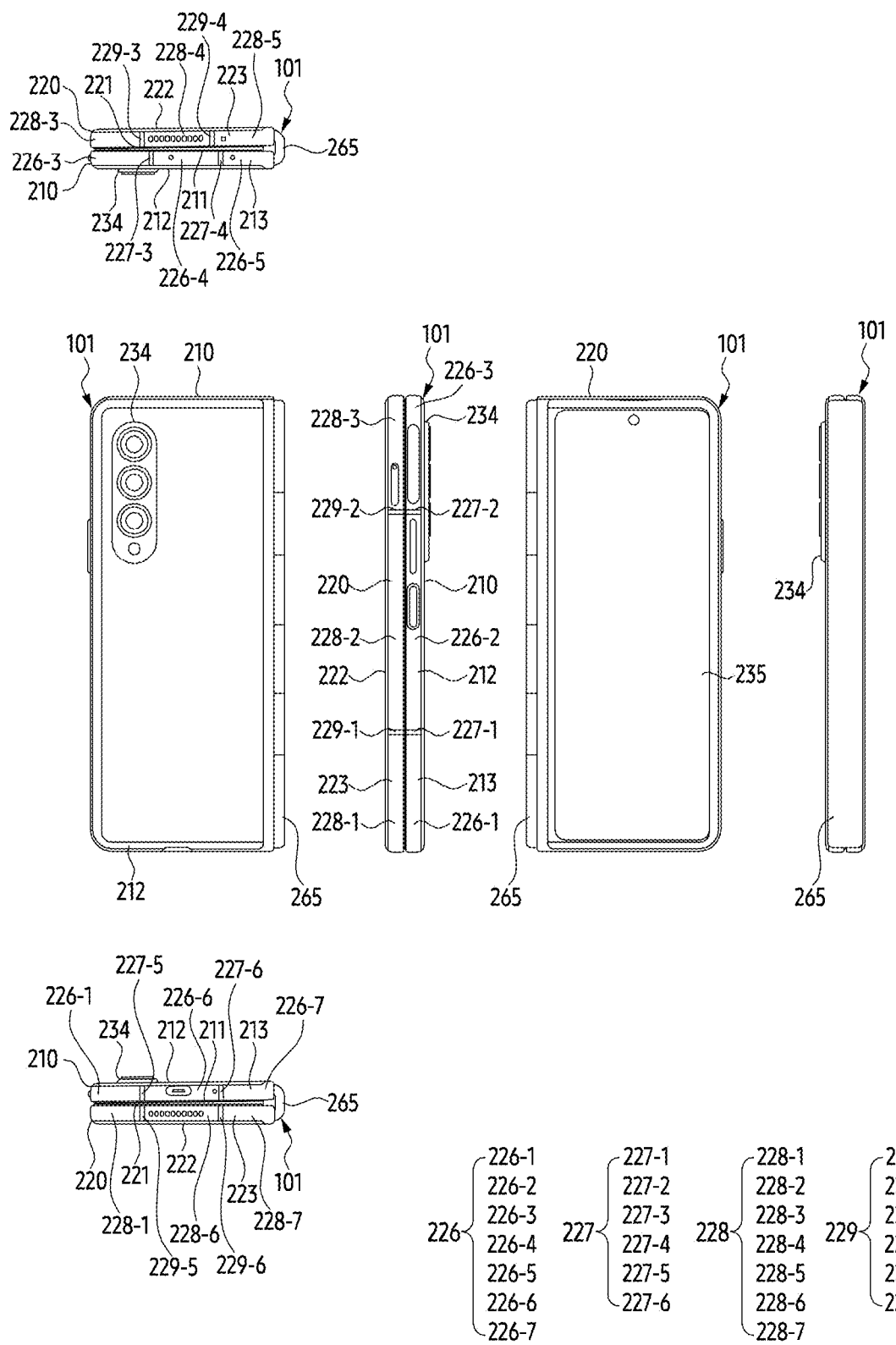
FIG. 2B illustrates an example of a completely folding state of an electronic device according to an embodiment.

FIG. 2B illustrates an example of a completely folding state of an electronic device according to an embodiment.

Figure 2C:
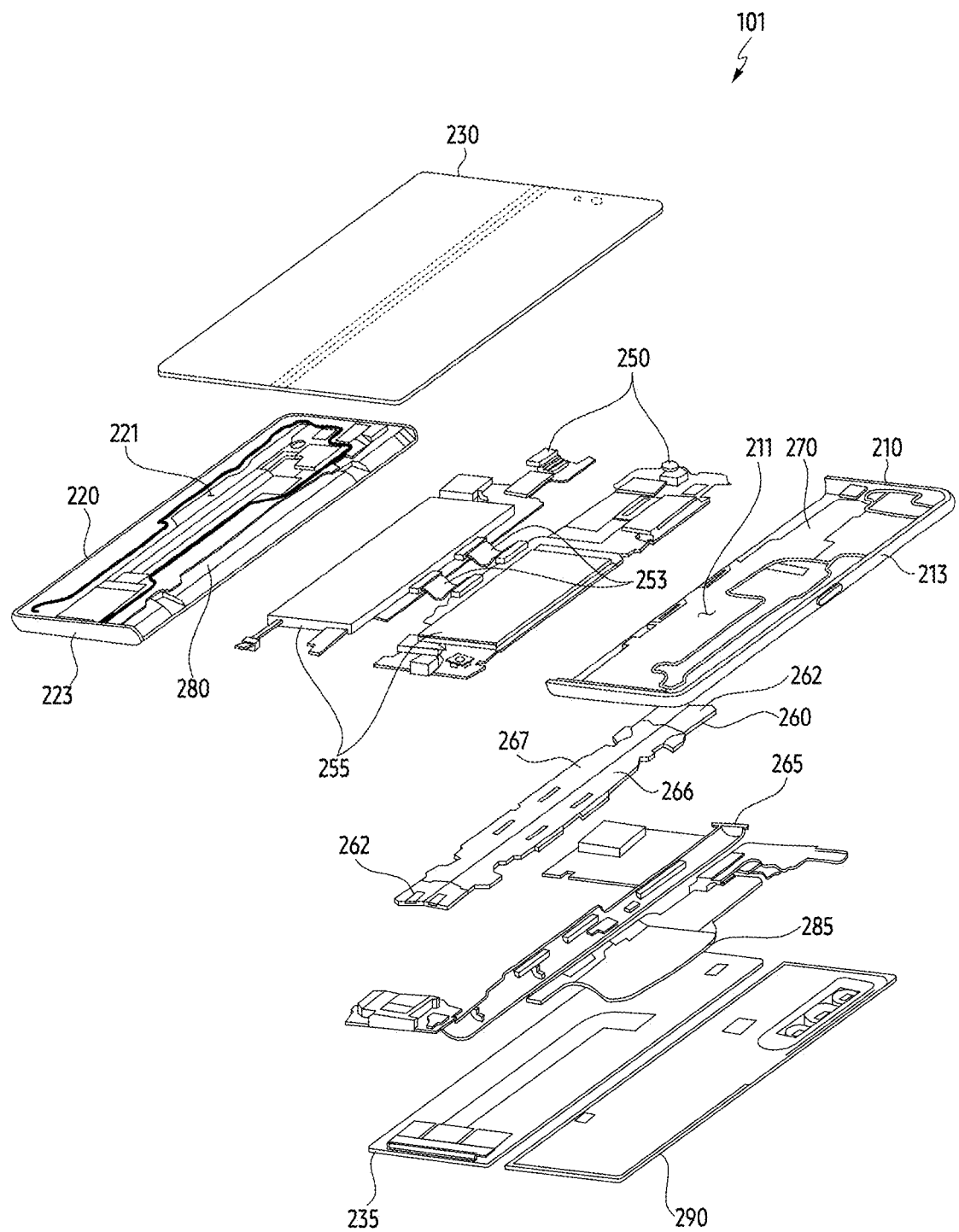
FIG. 2C is an expanded view of an electronic device according to an embodiment.

FIG. 2C is an expanded view of an electronic device according to an embodiment.

Figure 3A:
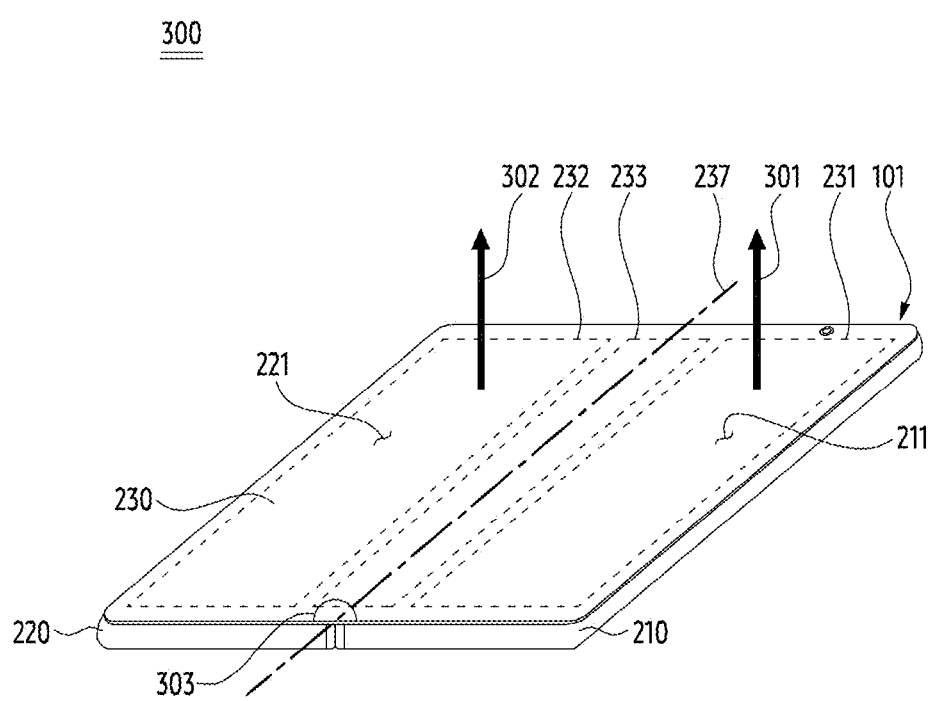
FIG. 3A illustrates an example of a positional relationship between a first housing and a second housing in an unfolding state of an electronic device according to an embodiment.

FIG. 3A illustrates an example of a positional relationship between a first housing and a second housing in an unfolding state of an electronic device according to an embodiment.

Figure 3B:
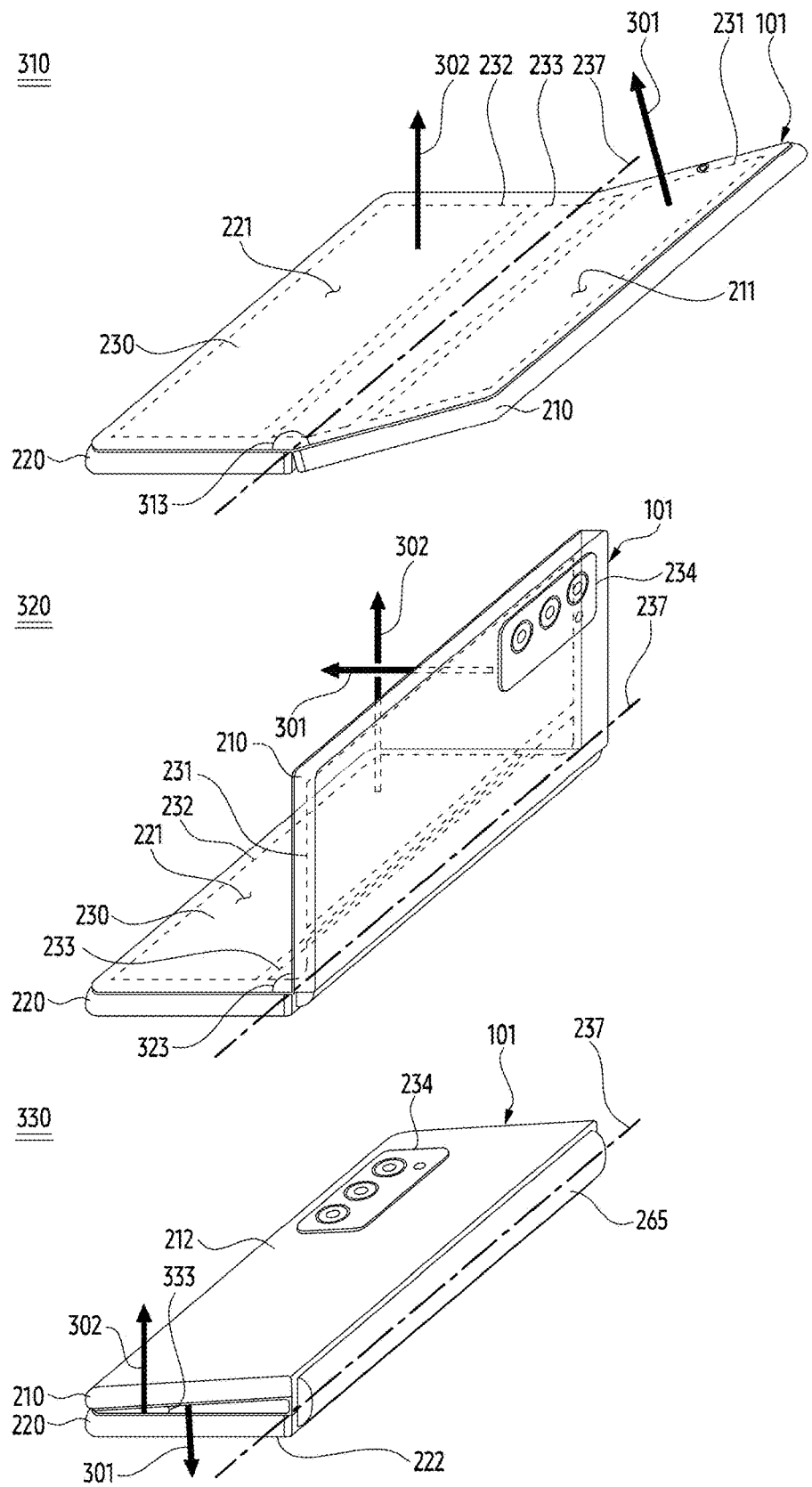
FIG. 3B illustrates an example of positional relationships between the first housing and the second housing in a folding state of the electronic device according to an embodiment.

FIG. 3B illustrates an example of positional relationships between the first housing and the second housing in a folding state of the electronic device according to an embodiment.

Referring to FIGS. 2A, 2B, and 2C, the electronic device 101 may include a first housing 210, a second housing 220, a flexible display panel 230, and a folding housing 265 (shown in FIG. 2B).

In an embodiment, the first housing 210 may include a first surface 211, a second surface 212 faced away the first surface 211, and a first side surface 213 surrounding at least a portion of the first surface 211 and the second surface 212. In an embodiment, the second surface 212 may further include at least one camera module 234 exposed through a portion of the second surface 212. In an embodiment, the first housing 210 may include a first protective member 214 disposed along at least some of the periphery of the first surface 211. In an embodiment, the first protective member 214 may prevent the inflow of foreign substances (e.g., dust or moisture) through an interval between the flexible display panel 230 and the first housing 210. In an embodiment, the first protective member 214 may be attached to the first side 213 of the first housing 210. In an embodiment, the first protective member 214 may be integrally formed with the first side surface 213. In an embodiment, the first housing 210 may provide a space formed by the first surface 211, the second surface 212, and the first side surface 213 as a space for mounting components of the electronic device 101. In an embodiment, the first side surface 213 may include a plurality of conductive members 226, a plurality of non-conductive members 227, or a combination thereof. For example, the plurality of conductive members 226 may include a conductive member 226-1, a conductive member 226-2, a conductive member 226-3, a conductive member 226-4, a conductive member 226-5, and a conductive member 226-7, spaced apart from each other and A plurality of non-conductive members 227 may include a non-conductive member 227-1, a non-conductive member 227-2, a non-conductive member 227-3, a non-conductive member 227-4, a non-conductive member 227-5, and a non-conductive member 227-6, spaced apart from each other. However, it is not limited thereto.

In an embodiment, the second housing 220 may include a third surface 221, a fourth surface 222 faced away the third surface 221, and a second side surface 223 surrounding at least a portion of the third surface 221 and the fourth surface 222. In an embodiment, the fourth surface 222 may further include a display panel 235 disposed on the fourth surface 222. In an embodiment, the second housing 220 may include a second protective member 224 disposed along at least a portion of edges of the third surface 221. In an embodiment, the second protective member 224 may prevent the inflow of foreign substances (e.g., dust or moisture) through an interval between the flexible display panel 230 and the second housing 220. In an embodiment, the second protective member 224 may be attached to the second side 223 of the first housing 220. In an embodiment, the second protective member 224 may be integrally formed with the second side surface 223. In an embodiment, the second housing 220 may provide a space formed by the third surface 221, the fourth surface 222, and the second side surface 223 as a space for mounting components of the electronic device 101. In an embodiment, the second side surface 223 may include a plurality of conductive members 228, a plurality of non-conductive members 229, or a combination thereof. For example, the plurality of conductive members 228 may include a conductive member 228-1, a conductive member 228-2, a conductive member 228-3, a conductive member 228-4, a conductive member 228-5, a conductive member 228-6, and a conductive member 228-7 spaced apart from each other and a plurality of non-conductive members (229) may include a non-conductive member (229-1), a non-conductive member (229-2), a non-conductive member (229-3), a non-conductive member (229-4), and a non-conductive member (229-6) spaced apart from each other. However, it is not limited thereto.

In an embodiment, at least a portion of a plurality of conductive members 226, at least a portion of a plurality of conductive members 228, at least a portion of a plurality of non-conductive members 227, at least a portion of a plurality of non-conductive members 229, or a combination thereof may form at least one antenna structure.

In an embodiment, the second side surface 223 may be rotatably connected to the first side surface 213 through a hinge structure 260 (shown in FIG. 2C) mounted in the folding housing 265. In an embodiment, the hinge structure 260 may include hinge modules 262, a first hinge plate 266, and a second hinge plate 267. In an embodiment, the first hinge plate 266 may be connected to the first housing 210, and the second hinge plate 267 may be connected to the second housing 220.

In an embodiment, the flexible display panel 230 may include a window exposed toward the outside. In an embodiment, the window may be used to protect the flexible display panel 230. In an embodiment, since the window is implemented using a transparent member, the image displayed on the flexible display panel 230 may be viewable outside the electronic device 101 through the window. In an embodiment, the window may include a glass material such as ultra-thin glass (UTG) or a polymer material such as polyimide (PI). In an embodiment, the flexible display panel 230 may be disposed on the first surface 211 of the first housing 210 and the third surface 221 of the second housing 220 across the folding housing 265 and include a first display area 231 corresponding to the first surface 211, a second display area 232 corresponding to the third surface 221, and a third display area 233 between the first display area 231 and the second display area 232 within the front surface of the flexible display panel 230. In an embodiment, the first display area 231 may be disposed on at least a part of the first surface 211, and the second display area 232 may be disposed on the third surface 221.

In one configuration, a part of the display area (e.g., the first display area 231, the second display area 232, or the third display area 233) of the flexible display panel 230 may include at least one recess or at least one opening. In one configuration, the at least one recess or the at least one opening may not be included in the flexible display panel 230, but may be covered by the flexible display panel 230 and included in a support member (e.g., bracket) supporting the flexible display panel 230. In an embodiment, the electronic device 101 may include at least one component for obtaining data from the outside of the electronic device 101 through the at least one recess or the at least one opening. For example, the at least one component may include at least one of a camera 236 or a sensor module 238 disposed in the first display area 231. In an embodiment, at least one of the camera 236 and the sensor module 238 may be disposed below the rear surface of the first display area 231. In an embodiment, at least one of the camera 236 or the sensor module 238 may be wrapped by the flexible display panel 230. In one configuration, at least one of the camera 236 or the sensor module 238 wrapped by the flexible display panel 230 may not be exposed to the outside. However, it is not limited thereto.

Meanwhile, although not illustrated in FIGS. 2a and 2b, in an embodiment, the flexible display panel 230 may further include a rear surface opposite to the front surface. In an embodiment, the flexible display panel 230 may be supported by the first support member 270 of the first housing 210 and the second support member 280 of the second housing 220.

In an embodiment, the folding housing 265 may be configured to form a first housing 210 and form a first support member 270 and a second housing 220 fastened to the first hinge plate 266 and pivotably connect the second support member 280 coupled to the second hinge plate 267. In an embodiment, the folding housing 265 may be at least partially exposed between the first housing 210 and the second housing 220 while the electronic device 101 is in a folding state defined in the following description. In an embodiment, the folding housing 265 may be covered by the first housing 210 and the second housing 220 while the electronic device 101 is in an unfolding state defined in the following description.

In an embodiment, the electronic device 101 may be folded based on the axis 237 passing through the folding housing 265. For example, the folding housing 265 may be disposed between the first housing 210 and the second housing 220 of the electronic device 101 to allow the electronic device 101 to be bent, curved, or folded. For example, the first housing 210 may be connected to the second housing 220 through a hinge structure 260 mounted in the folding housing 265 and may rotate about an axis 237. For example, the hinge structure 260 may include hinge modules 262 disposed at both ends of the first hinge plate 266 and the second hinge plate 267. In an embodiment, the hinge modules 262 may include hinge gears interdigitated therein. In an embodiment, the first hinge plate 266 and the second hinge plate 267 may rotate about an axis 237 through the hinge gears. In an embodiment, the electronic device 101 may be folded so that the first housing 210 and the second housing 220 face each other by rotating about the axis 237.

In an embodiment, the electronic device 101 may be folded so that the first housing 210 and the second housing 220 be laid over or overlap each other. The axis 237 may be referred to as a folding axis in terms of a reference for folding the electronic device 101.

In an embodiment, the electronic device 101 may include a plurality of components in a space formed by the first housing 210, the second housing 220, the flexible display panel 230, and the folding housing 265. For example, referring to FIG. 2c, the electronic device 101 may include a first support member 270, a second support member 280, a hinge structure 260 surrounded by a folding housing 265, flexible display panel 230, printed circuit boards (PCB) 250, batteries 255, a folding housing 265, an antenna 285, display panel 235 and a rear plate 290. According to embodiments, at least some of the plurality of components may not be included in the electronic device 101.

In an embodiment, the hinge structure 260 may include hinge modules 262, a first hinge plate 266, and a second hinge plate 267. In an embodiment, the hinge modules 262 may include hinge gears that pivotably connect the first hinge plate 266 and the second hinge plate 267. The hinge gears are engaged with each other to rotate, thereby rotating the first hinge plate 266 and the second hinge plate 267.

In an embodiment, the first hinge plate 266 may be coupled to the first support member 270 of the first housing 210, and the second hinge plate 267 may be coupled to the second support member 280 of the second housing 220. The first housing 210 and the second housing 220 may be rotated by at least one rotation of the first hinge plate 266 or the second hinge plate 267.

In an embodiment, the first housing 210 may include a first support member 270, and the second housing 220 may include a second support member 280. In an embodiment, at least a portion of the first support member 270 may be surrounded by the first side surface 213, and at least a portion of the second support member 280 may be surrounded by the second side surface 223. In an embodiment, the first support member 270 may be integrally formed with the first side surface 213, and the second support member 280 may be integrally formed with the second side surface 223. In an embodiment, the first support member 270 may be a separate component distinguished from the first side surface 213, and the second support member 280 may be a separate component distinguished from the second side surface 223. In an embodiment, the first side surface 213 and the second side surface 223 may be formed of a metal material, a non-metal material, or a combination thereof. In an embodiment, at least a portion of the first side surface 213 and at least a portion of the second side surface 223 may be used as at least one antenna structure.

The first support member 270 may be coupled to the flexible display panel 230 on at least a portion of one surface of the first support member 270, and may be coupled to the rear plate 290 on at least a portion of the other surface of the first support member 270. The second support member 280 may be coupled to the flexible display panel 230 in at least a portion of one surface of the second support member 280 and may be coupled to the display panel 235 on the other surface of the second support member 280.

In an embodiment, printed circuit boards 250 and a battery 255 may be included between a surface formed by the first support member 270 and the second support member 280 and a surface formed by the display panel 235 and the rear plate 290. The PCBs 250 may include a first PCB disposed in the first support member 270, and a second PCB disposed in the second support member 280 and spaced apart from the first PCB. The first PCB and the second PCB may be connected to each other through at least one FPCB 253. The shape of the first PCB may be distinguished from the shape of the second PCB according to the internal shape of the electronic device 101. In an embodiment, the PCBs 250 may mount at least a portion of a processor, memory, or interface.

In an embodiment, the batteries 255 may be used to provide power to at least one component of the electronic device 101. In an embodiment, the batteries 255 may be rechargeable. In an embodiment, at least some of the batteries 255 may be disposed on substantially the same plane as the plane defined by the PCBs 250. For example, the PCBs 250 and the batteries 255 may be disposed on the second surface 212 and fourth surface 222, unlike the flexible display panels 230 disposed on the first surfaces 211 and third surfaces 221. In an embodiment, the PCBs 250 and the batteries 255 may be supported by at least a portion of the first support member 270 and at least a portion of the second support member 280.

In an embodiment, the antenna 285 may be disposed between the rear plate 290 and the battery supported by at least a part of the first support member 270 of the batteries 255. For example, the antenna 285 may include a near field communication (NFC) antenna, a wireless charging antenna, and/or a magnetic secure transmission (MST) antenna. For example, antenna 285 may perform short-range communication with an external device or wirelessly transmit and receive power utilized for charging. However, it is not limited thereto.

In an embodiment, the electronic device 101 may provide an unfolding state in which the first housing 210 and the second housing 220 are fully folded out by the folding housing 265. For example, referring to FIG. 3A, the electronic device 101 may be in the unfolding state 300. In an embodiment, the state 300 may mean a state in which the first direction 301 facing the first surface 211 corresponds to the second direction 302 facing the third surface 221. For example, in the state 300, the first direction 301 may be parallel to the second direction 302. For example, in the state 300, the first direction 301 may be the same as the second direction 302. In an embodiment, the first surface 211 may form substantially one plane with the third surface 221 in the state 300. In an embodiment, an angle 303 between the first surface 211 and the third surface 221 in the state 300 may be 180 degrees. In an embodiment, the state 300 may mean a state in which all of the entire display area of the flexible display panel 230 may be provided on substantially one plane. For example, the state 300 may mean a state in which all of the first display area 231, the second display area 232, and the third display area 233 can be provided on one plane. For example, in the state 300, the third display area 233 may not include a curved surface. In an embodiment, the unfolding state may be referred to as an outspread state or an outspreading state.

In an embodiment, the electronic device 101 may provide a folding state in which the first housing 210 and the second housing 220 are folded in by the folding housing 265. For example, referring to FIG. 3B, the electronic device 101 may be in the folding state including a state 310, a state 320, and a state 330. In an embodiment, the folding state including the state 310, the state 320, and the state 330 may mean a state in which the first direction 301 facing the first surface 211 is distinguished from the second direction 302 facing the third surface 221. For example, in state 310, an angle between the first direction 301 and the second direction 302 may be 45 degrees, and the first direction 301 and the second direction 302 may be distinguished from each other; and in the state 320, an angle between the first direction 301 and the second direction 302 is 90 degrees, and the first direction 301 and the second direction 302 are distinguished from each other; and in state 330, an angle between the first direction 301 and the second direction 302 may be substantially 180 degrees, and the first direction 301 and the second direction 302 may be distinguished from each other. In an embodiment, an angle between the first surface 211 and the third surface 221 in the folding state may be greater than or equal to 0 degrees and less than 180 degrees. For example, in state 310, the angle 313 between the first surface 211 and the third surface 221 may be 135 degrees, and in state 320, the angle 323 between the first surface 211 and the third surface 221 may be 90 degrees, and in state 330, the angle 333 between the first surface 211 and the third surface 221 may be substantially 0 degrees. In an embodiment, the folding state may be referred to as a folding state.

In an embodiment, the folding state may include a plurality of sub-folding states, unlike the unfolding state. For example, referring to FIG. 3B, the folding state may include a fully folding state 330 in which the first surface 211 substantially overlaps the third surface 221 by rotation provided through the folding housing 265 and the intermediate folding state 310 between the state 330 and the unfolding state (e.g., the state 300 of FIG. 3A) and the plurality of sub-folding states including the state 320. For example, the electronic device 101 may provide a state 330 in which the entire area of the first display area 231 substantially completely overlaps the entire area of the second display area 232 as the first surfaces 211 and third surfaces 221 face each other by the folding housing 265. For example, the electronic device 101 may provide a state 330 in which the first direction 301 is substantially opposite to the second direction 302. As another example, the state 330 may mean a state in which the flexible display panel 230 is covered in the view of the user who is looking at the electronic device 101. However, it is not limited thereto.

In an embodiment, the flexible display panel 230 may be bent by rotation provided through the folding housing 265. For example, in the flexible display panel 230, unlike the first display area 231 and the second display area 232, the third display area 233 may be bent according to a folding operation. For example, the third display area 233 may be in a curved state to prevent damage to the flexible display panel 230 within the fully folding state. In the fully folding state, unlike the third display area 233 being curved, the entire first display area 231 may completely overlap the entire second display area 232.

Meanwhile, FIGS. 2A, 2B, 2C, 3A, and 3B illustrate an example in which the flexible display panel 230 of the electronic device 101 includes one folding display area (e.g., the third display area 233) or the electronic device 101 includes one folding housing (e.g., the folding housing 265), but this is for convenience of explanation. According to embodiments, the flexible display panel 230 of the electronic device 101 may include a plurality of folding display areas. For example, the flexible display panel 230 of the electronic device 101 may include two or more folding display areas, and the electronic device 101 may include two or more folding housings for providing each of the two or more folding areas.

Figure 4:
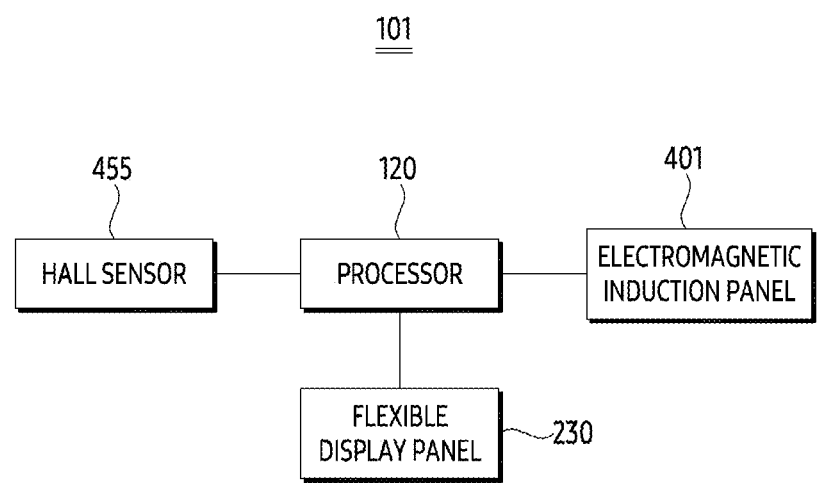
FIG. 4 is a simplified block diagram of an electronic device according to an embodiment.

FIG. 4 is a simplified block diagram of an electronic device according to an embodiment. The block diagram may indicate a functional configuration of the electronic device 101 shown in each of FIGS. 1 and 2A, 2B, 2C, 3A, and 3B.

Figure 5:
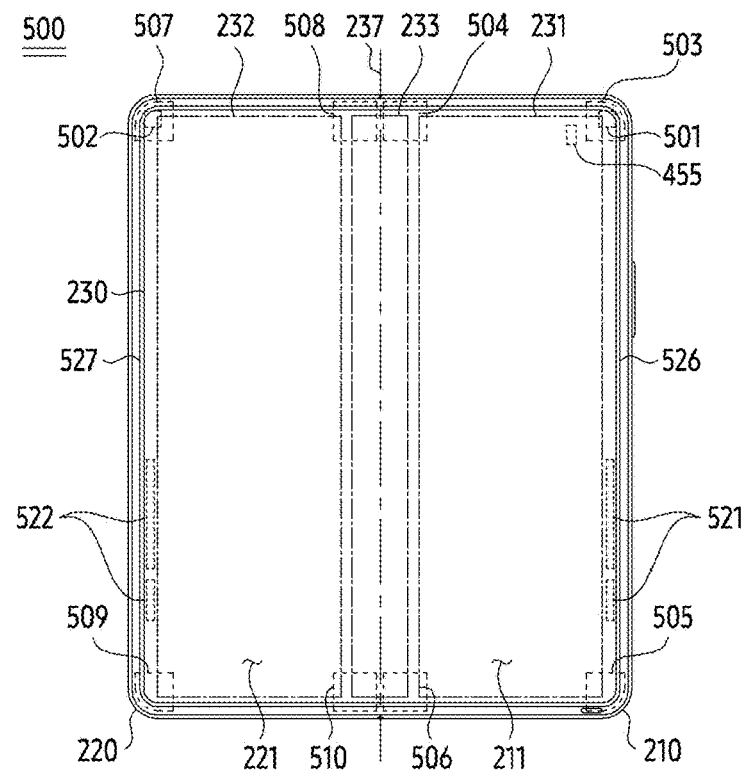
FIG. 5 is a top view and a bottom view of an electronic device in an unfolding state including a hall sensor in a first housing according to an embodiment.
Figure 5:
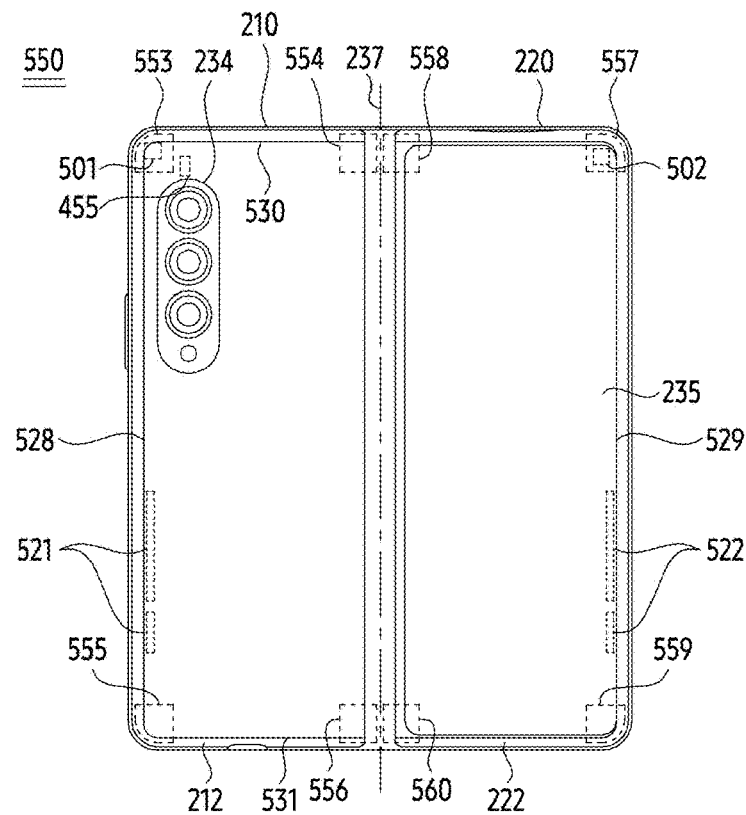

According to an embodiment, FIG. 5 is a top view and a bottom view of an electronic device in an unfolding state including a hall sensor in a first housing.

Figure 6A:
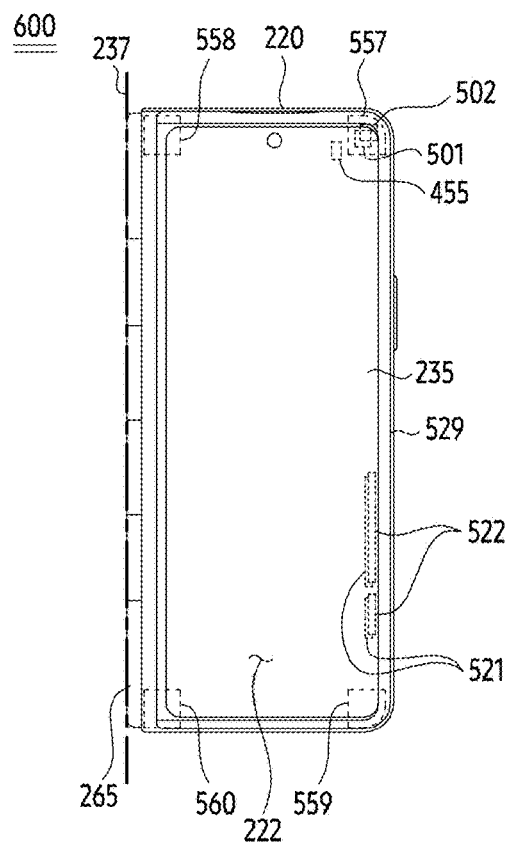
FIG. 6A is a top view and a bottom view of an electronic device in a folding state, according to an embodiment.
Figure 6A:
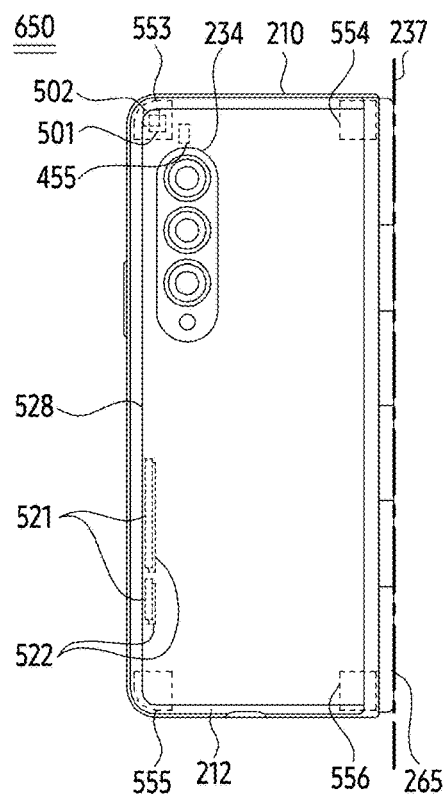

FIG. 6A is a top view and a bottom view of an electronic device in a folding state, according to an embodiment.

Figure 6B:
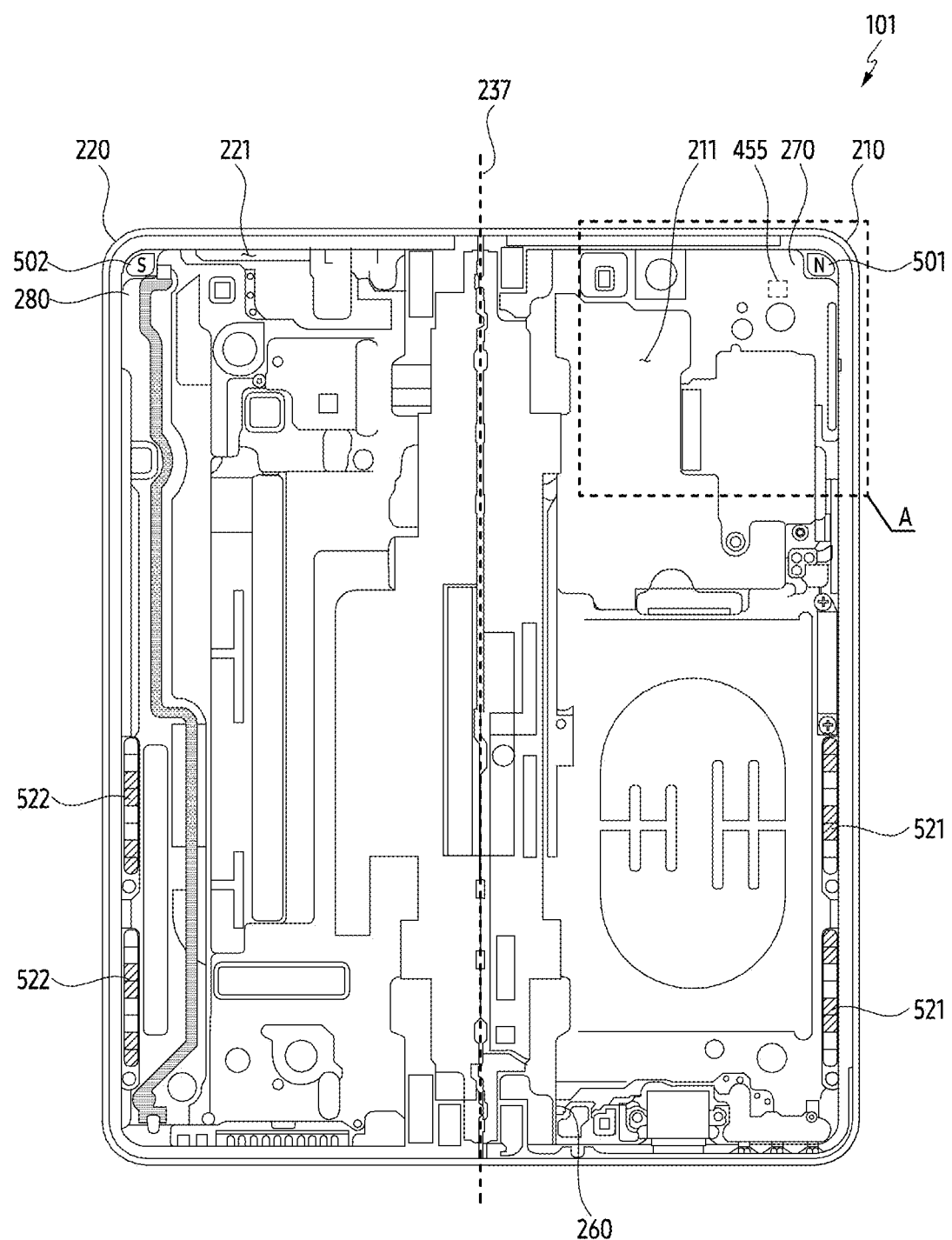
FIG. 6B is a top view of the electronic device of FIG. 5 from which a flexible display panel is removed, according to an embodiment.

FIG. 6B is a top view of the electronic device of FIG. 5 from which a flexible display panel is removed, according to an embodiment.

Figure 6C:
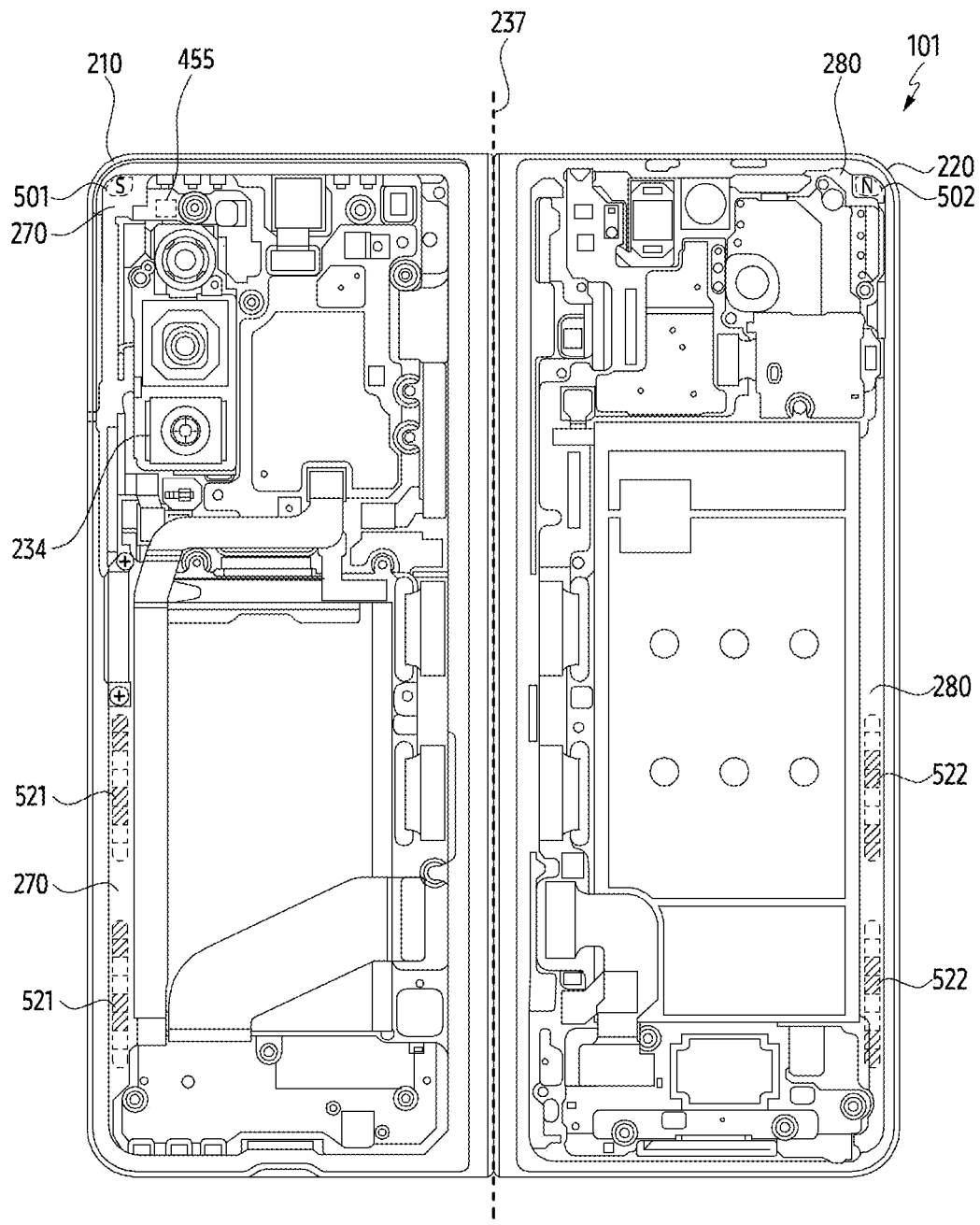
FIGS. 6C and 6D are bottom views of the electronic device of FIG. 5 from which the display panel and the rear plate are removed, according to an embodiment.
Figure 6D:
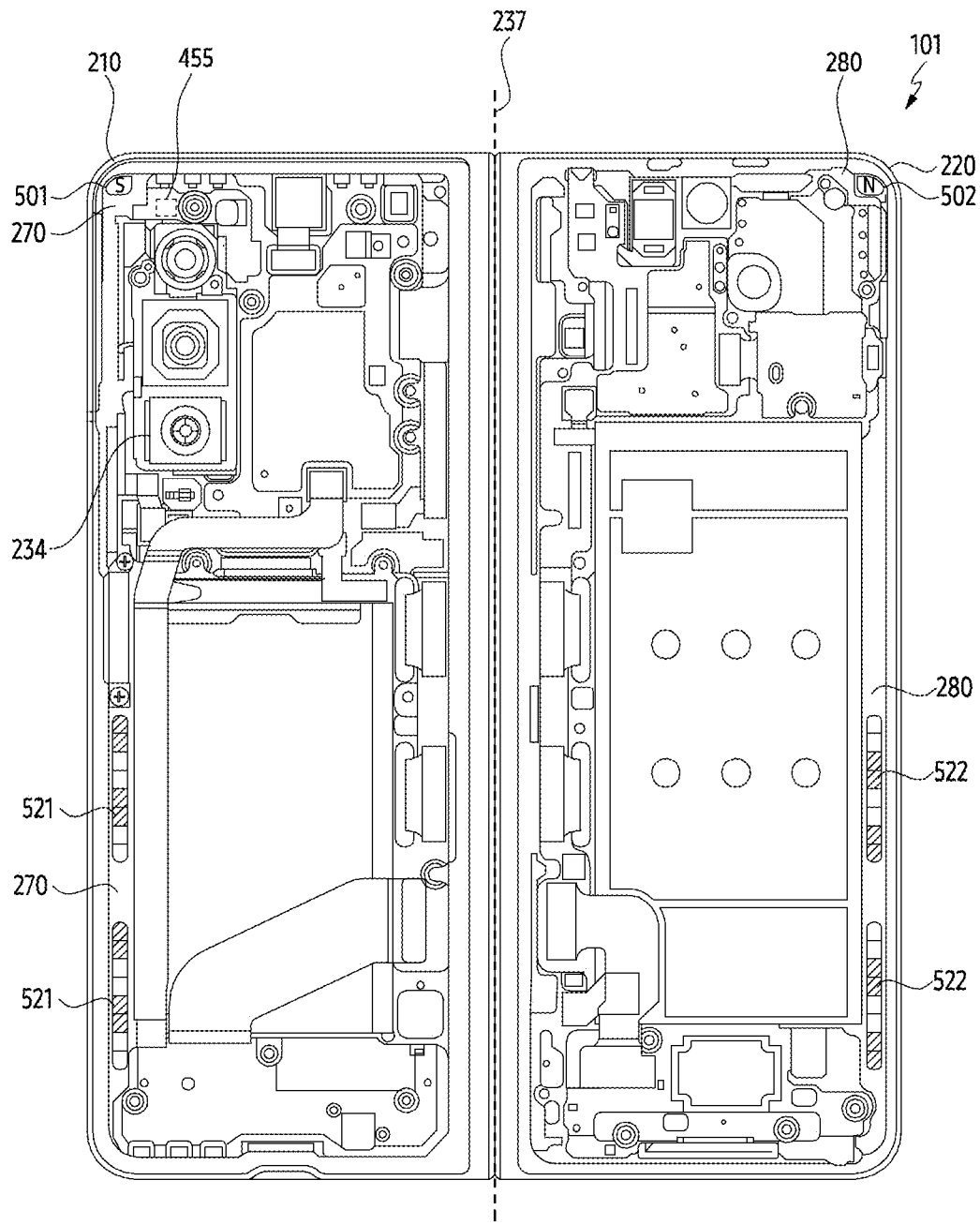

FIGS. 6C and 6D are bottom views of the electronic device of FIG. 5 from which the display panel and the rear plate are removed, according to an embodiment.

Figure 7A:
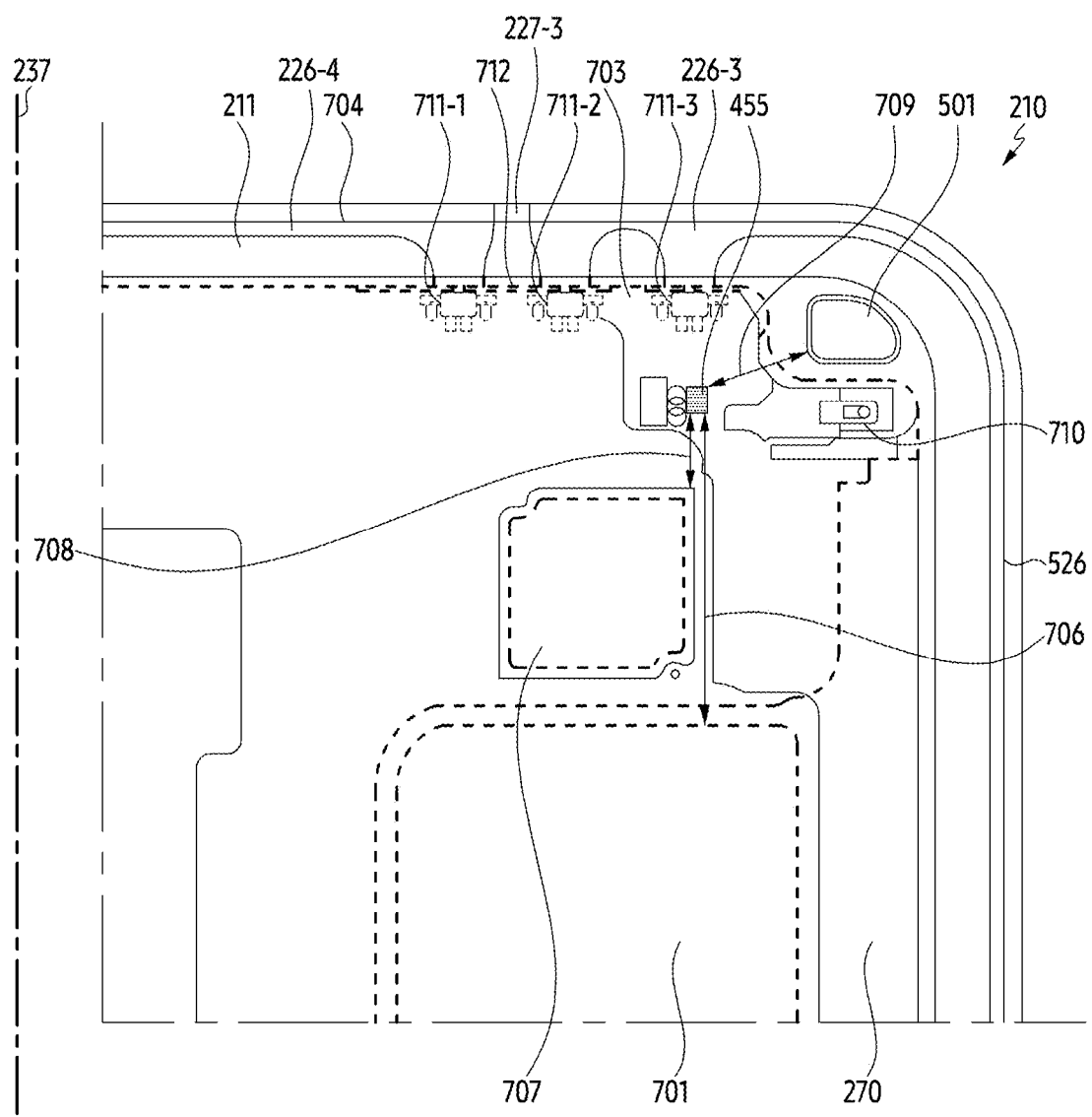
FIG. 7A is a top view of an electronic device indicating an area A of FIG. 6B according to an embodiment.

FIG. 7A is a top view of an electronic device indicating an area A of FIG. 6B according to an embodiment.

Figure 7B:
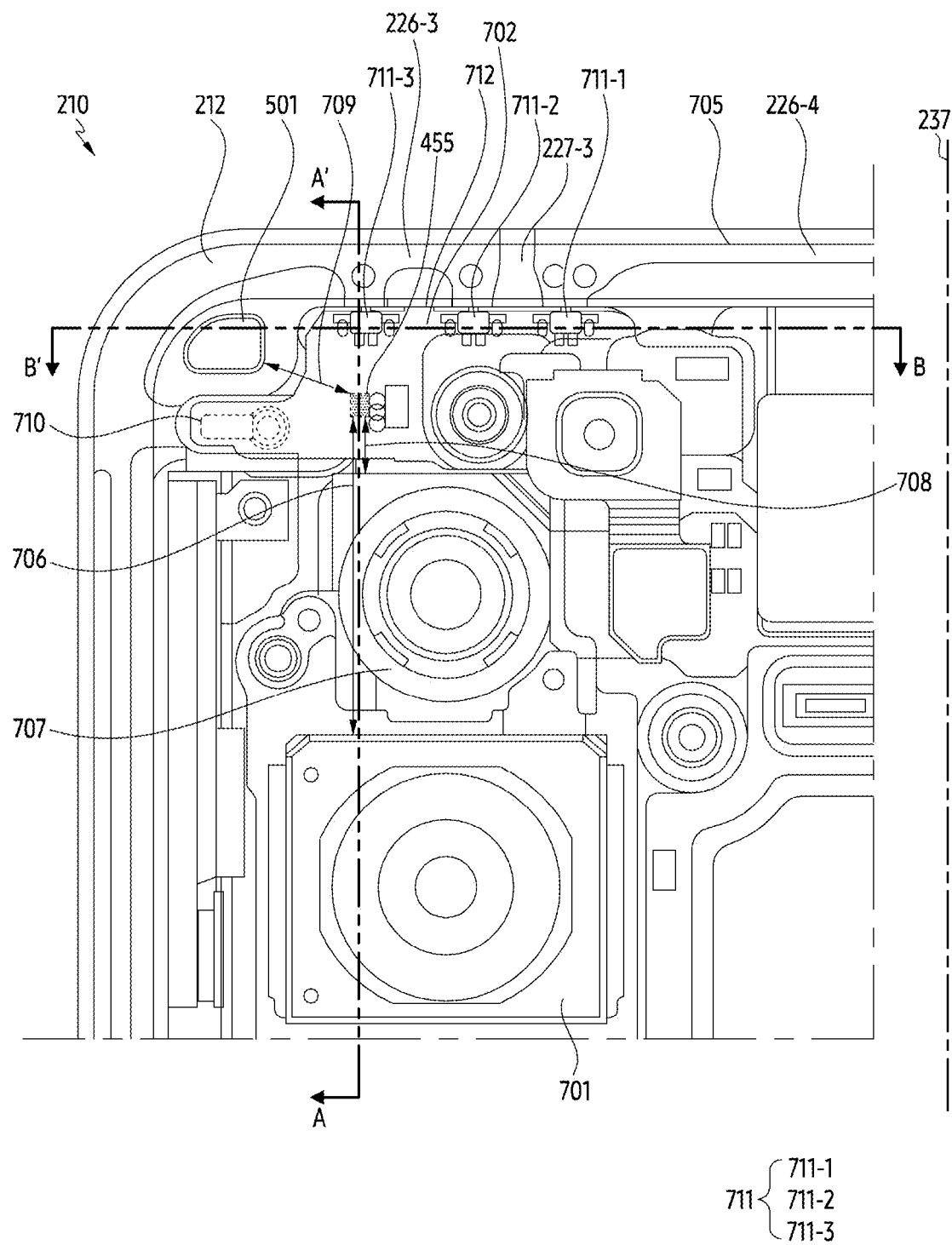
FIG. 7B is a bottom view of an electronic device indicating area A of FIG. 6B according to an embodiment.

FIG. 7B is a bottom view of an electronic device indicating area A of FIG. 6B according to an embodiment.

Figure 7C:
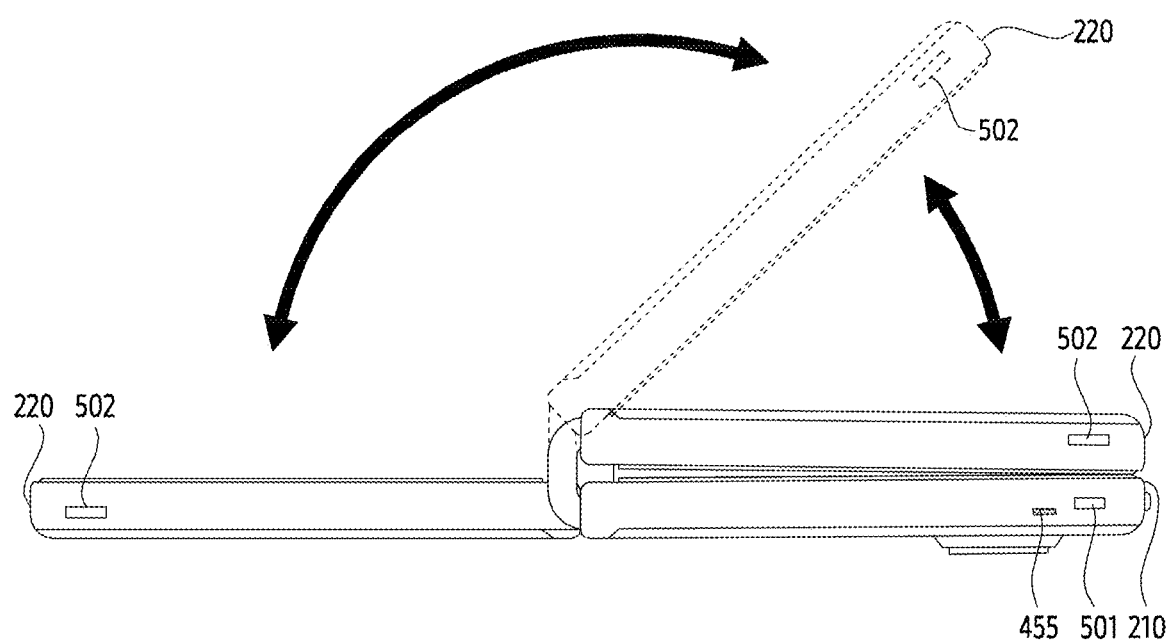
FIG. 7C illustrates an example of a positional relationship between magnets in an electronic device according to an embodiment.

FIG. 7C illustrates an example of a positional relationship between magnets in an electronic device according to an embodiment.

Figure 8:
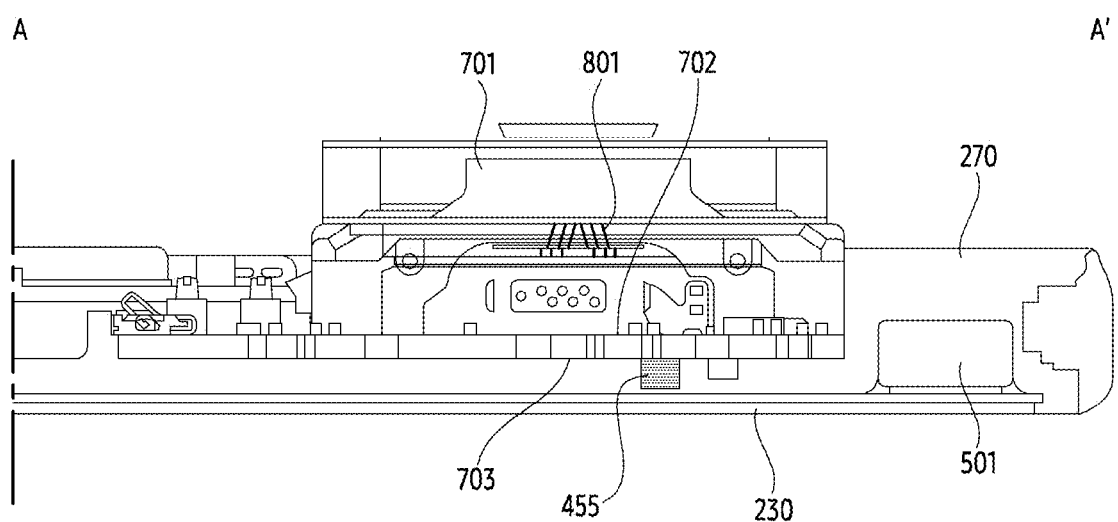
FIG. 8 is a section view taken along line A-A' of FIG. 7B.

FIG. 8 is a section view cut along line A-A' of FIG. 7B.

Figure 9:
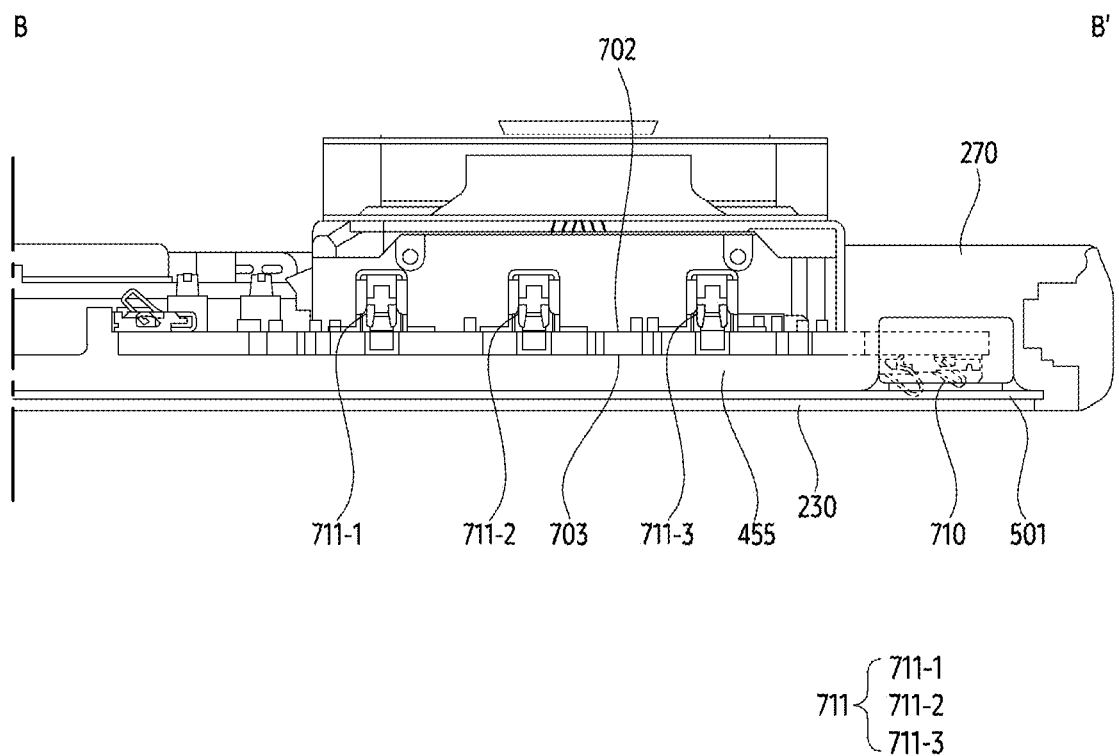
FIG. 9 is a section view taken along line B-B' of FIG. 7B.

FIG. 9 is a section view taken along line B-B' of FIG. 7B.

Figure 10:
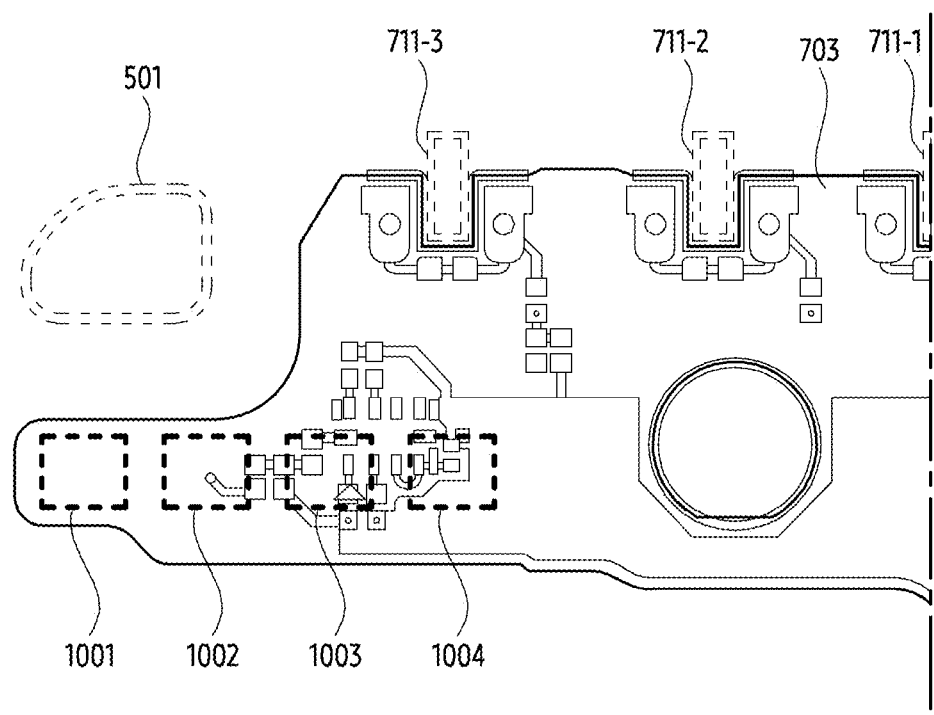
FIG. 10 illustrates an example of candidate positions of a hall sensor in an electronic device according to an embodiment.
Figure 10:
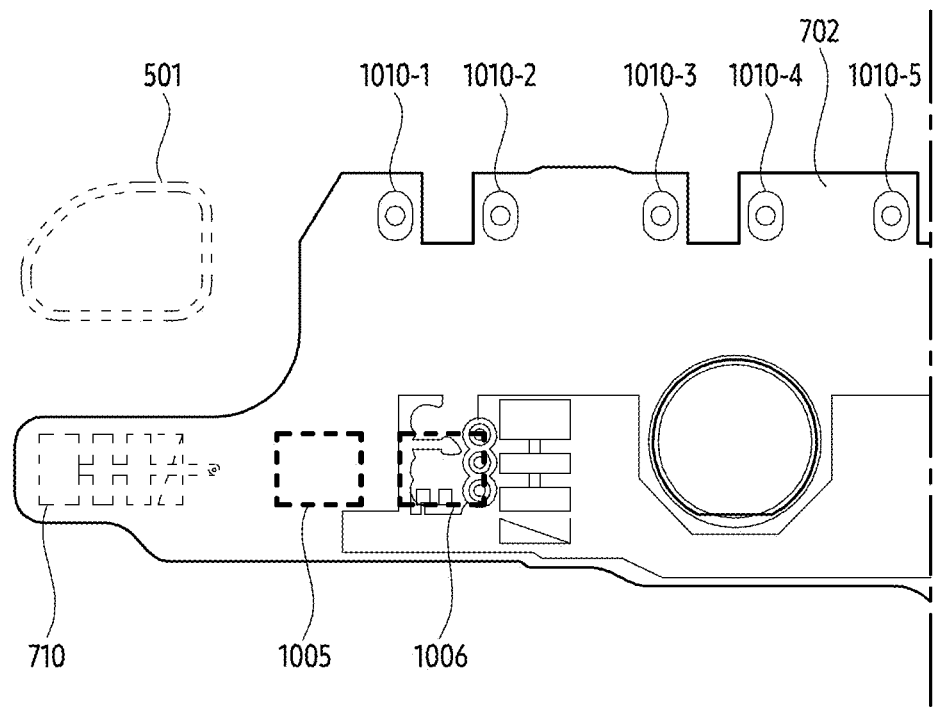

FIG. 10 illustrates an example of candidate positions of a hall sensor in an electronic device according to an embodiment.

Figure 11:
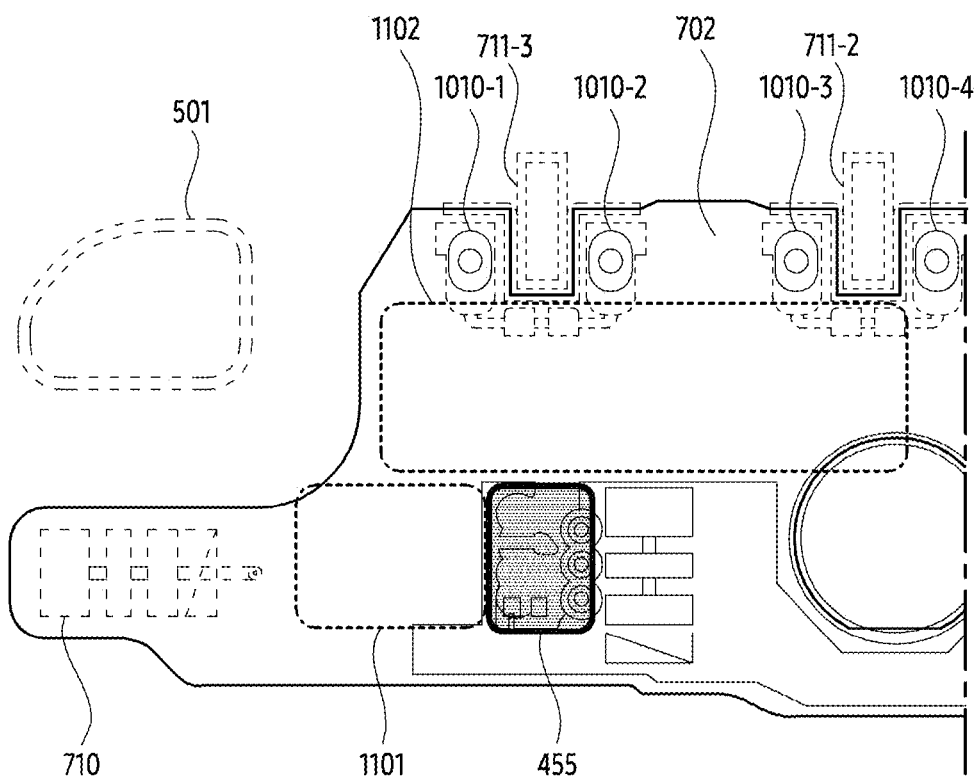
FIG. 11 illustrates an example of a layer in a PCB on which a hall sensor in an electronic device is mounted, according to an embodiment.

FIG. 11 illustrates an example of a layer in a PCB on which a hall sensor in an electronic device is mounted, according to an embodiment.

Figure 12:
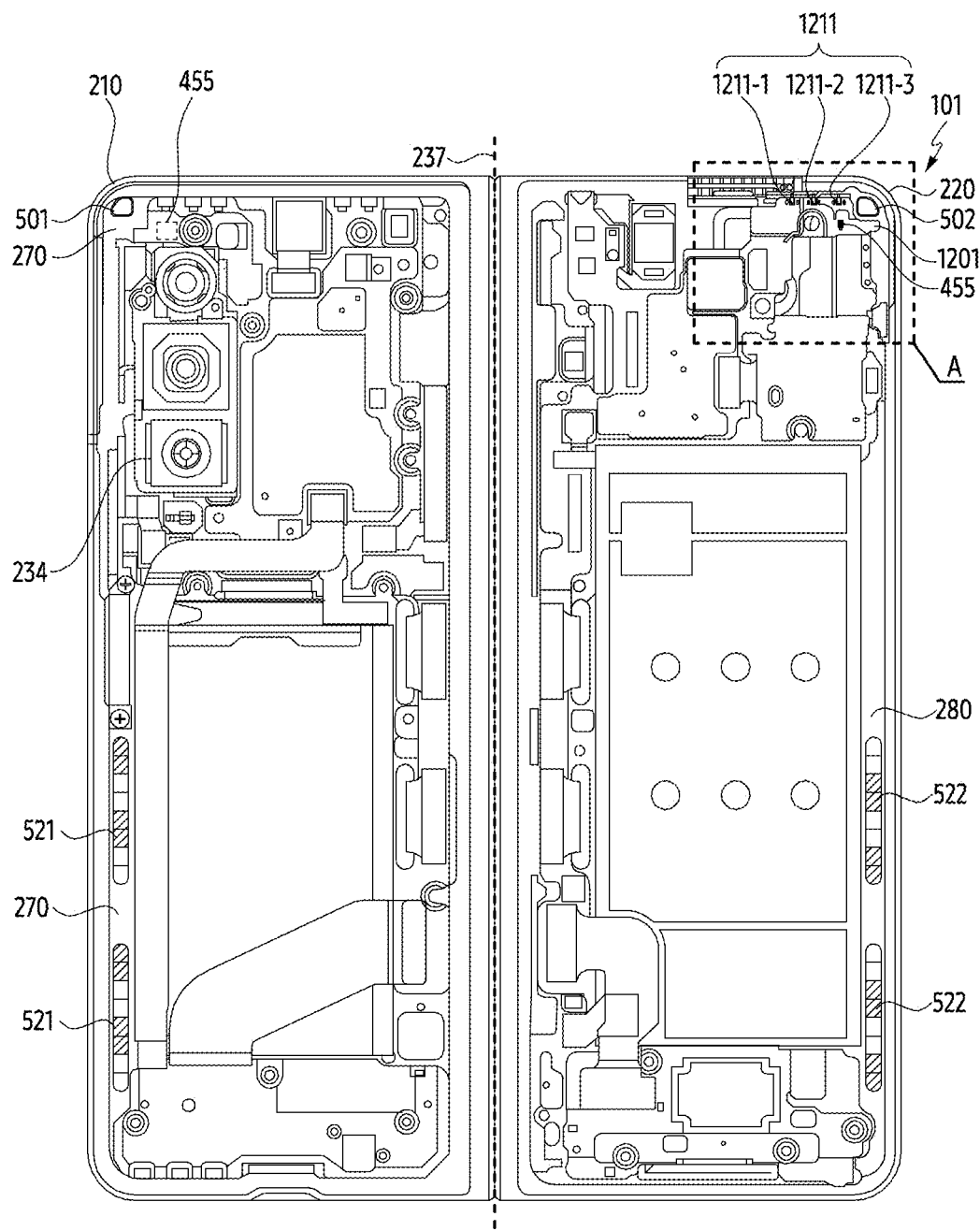
FIG. 12 is a bottom view of an electronic device in an unfolding state in which a display panel and a rear plate are removed, including a hall sensor in a second housing according to an embodiment.

FIG. 12 is a bottom view of an electronic device in an unfolding state in which a display panel and a rear plate are removed, including a hall sensor in a second housing according to an embodiment.

Figure 13:
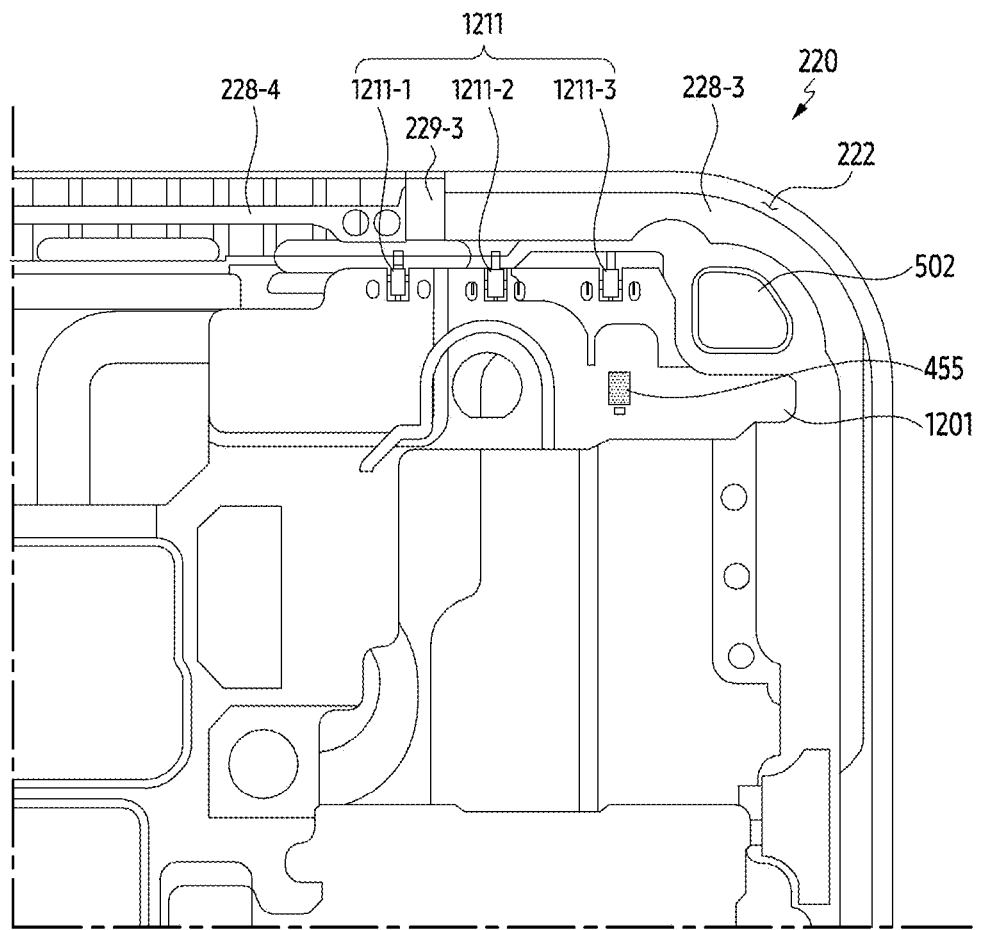
FIG. 13 is a bottom view of an electronic device illustrating area A of FIG. 12, according to an embodiment.

FIG. 13 is a bottom view of an electronic device illustrating area A of FIG. 12, according to an embodiment.

Referring to FIG. 4, the electronic device 101 may include a processor 120, a flexible display panel 230, an electromagnetic induction panel 401, and a hall sensor 455.

In an embodiment, the processor 120 may include the processor 120 illustrated in FIG. 1. In an embodiment, the processor 120 may be operatively or operably coupled with or connected with the flexible display panel 230. In an embodiment, the processor 120 may be operatively coupled or connected with the electromagnetic induction panel 401. In an embodiment, the processor 120 may be operatively coupled or connected with the hall sensor 455. For example, the processor 120 may include the sensor hub processor operatively coupled with the hall sensor 455 and defined through the description of FIG. 1. For example, the processor 120 may include the application processor operatively coupled with the hall sensor 455 and defined through the description of FIG. 1. However, it is not limited thereto.

In an embodiment, the flexible display panel 230 may include the display module 160 shown in FIG. 1. In an embodiment, flexible display panel 230 may be used to display an image obtained by processor 120 or an image obtained by display driving circuit. For example, the flexible display panel 230 may be used to display the image on at least one of the first display area 231, the second display area 232, or the third display area 233 under the control of the display driving circuit. However, it is not limited thereto.

In an embodiment, the flexible display panel 230 may include at least one of a cover panel (C-panel) for protecting the flexible display panel 230, A base substrate, a thin film transistors (TFT) layer formed on the base substrate, a pixel layer (or an organic light emitting layer) including pixels that emit light based on a voltage applied from the thin film transistor layer, or a polarizing layer disposed on the pixel layer. The flexible display panel 230 may further include any suitable components such as a thin film encapsulation layer (TFE) for encapsulating the pixel layer and a back film for supporting the base substrate. In an embodiment, the base substrate may be formed of a polymer material (e.g., polyimide (PI), etc.) to ensure flexibility of the substrate, but is not limited thereto. In an embodiment, the substrate may include at least one of polyethylene terephthalate, polymethyl methacrylate, polyamide, polyimide, polypropylene, and polyurethane. In an embodiment, the substrate may be formed of a plurality of layers. In an embodiment, the polarizing layer may enhance the clarity of an image displayed through the flexible display panel 230 by imparting directionality to light emitted from the flexible display panel 230 (e.g., pixel layer). In an embodiment, the flexible display panel 230 may further include a window disposed on the polarization layer. In some embodiments, the flexible display panel 230 may not include the polarization layer. For example, when the flexible display panel 230 does not include the polarization layer, the flexible display panel 230 may further include a color filter layer for enhancing the color purity and a black matrix layer (BM) for preventing light reflection on the thin film encapsulation layer to enhance visibility, or may further include the color filter layer and a black pixel define layer (PDL).

In an embodiment, the electromagnetic induction panel 401 (e.g., digitizer) may be used to receive a touch input from the stylus pen through interworking with a stylus pen including a coil. For example, the electromagnetic induction panel 401 may receive a touch input from the stylus pen based on an exchange of an electromagnetic signal with the stylus pen located within a specified distance from the electromagnetic induction panel 401 (or flexible display panel 230. In an embodiment, the electromagnetic induction panel 401 may be disposed under the flexible display panel 230. In an embodiment, the electromagnetic induction panel 401 may be spaced apart from the first area and the first area under the first display area 231 and may be formed in a second area under the second display area 232. For example, a space between the first area of the electromagnetic induction panel 401 and the second area of the electromagnetic induction panel 401 may be defined under at least a part of the third display area 233. However, it is not limited thereto. According to embodiments, the electromagnetic induction panel 401 may not be included in the electronic device 101.

In an embodiment, the hall sensor 455 may be used to identify whether the electronic device 101 is in the unfolding state (e.g., state 300) or in the folding state (e.g., state 330). For example, the processor 120 may obtain at least one of data on a magnetic field from a first magnet in the first housing 210 or data on a magnetic field from a second magnet in the second housing 220 through the hall sensor 455. In an embodiment, the first magnet may be disposed along a portion of the periphery of the first housing 210 parallel to the axis 237 spaced apart from the axis 237 and the second magnet may be disposed at a position corresponding to the position of the first magnet. In an embodiment, the first magnet may be disposed along a portion of a periphery spaced from and perpendicular to axis 237 and the second magnet may be disposed at a position corresponding to the position of the first magnet. In an embodiment, the first magnet may be disposed in a corner area spaced apart from the axis 237 among the corner areas of the first surface 211 of the first housing 210, the second magnet may be disposed at a position corresponding to the position of the first magnet.

For example, referring to FIG. 5, within a state 500 (e.g., the unfolding state) in which the first surface 211 and the third surface 221 form one plane, the magnet 501 which is the first magnet disposed under the first display area 231 may be disposed within the corner area 503 spaced apart from the axis 237 among the corner area 503 of the first surface 211, the corner area 504, the corner area 505, and the corner area 506; and the magnet 502, which is the second magnet disposed under the second display area 232, may be disposed in the corner area 507 of the third surface 221 corresponding to the corner area 503 of the first surface 211, and corner area 508 of the third surface 221 corresponding to the corner area 504 of the first surface 211, corner area 509 of the third surface 221 corresponding to the corner area 505 of the first surface 211, and the corner area 506 of the third surface 211. For example, within a state 550 (e.g., the unfolding state) in which the second surface 212 and the fourth surface 222 form one plane, the magnet 501 is disposed within the corner area 553 of the second surface 212 among the corner areas 553 of the second surface 212 corresponding to the corner areas 503 of the first surface 211, the corner area 554 of the second surface 212 corresponding to the corner area 504 of the first surface 211, the corner area 555 of the second surface 212 corresponding to the corner area 505 of the first surface 211, and the corner area 556 of the second surface 211 corresponding to the corner area 506 of the first surface 211; and the magnet 502 may be disposed in the corner region 557 of the fourth surface 222 among the corner region 557 of the fourth surface 222 corresponding to the corner region 553 of the second surface 212, the corner region 558 of the fourth surface 222 corresponding to the corner region 554 of the second surface 212, the corner region 559 of the fourth surface 222 corresponding to the corner region 555 of the second surface 212 and the corner region 560 of the fourth surface 222 corresponding to the corner region 556 of the second surface 212.

For example, referring to FIG. 6A, when looking at the fourth surface 222 in the state 600 (e.g., the fully folding state) in which at least a portion of the third surface 221 substantially overlaps on at least a portion of the first surface 211, the magnet 501 and the magnet 502 may be disposed within the corner region 557 of the fourth surface 222; and when looking at the second surface 212 in the state 650 (e.g., the fully folding state) in which at least a portion of the first surface 211 substantially overlaps at least a portion of the third surface 221, the magnet 501 and the magnet 502 may be disposed in the corner region 553 of the second face 212.

Although not illustrated in FIGS. 5 and 6A, in an embodiment, the magnet 501 may be disposed along at least a part of an edge 526 spaced apart from the axis 237 among edges of the first surface 211 parallel to the axis 237, and the magnet 502 may be disposed at a position corresponding to the position of the magnet 501. For example, the magnet 501 may be disposed along at least a portion of the edge 526 between the magnets 521 and the corner region 503 to be described later, and the magnet 502 may be disposed along the edge 527 between the magnets 522 and the corner region 507 to be described later and at a position corresponding to the position of the magnet 501. In an embodiment, the magnet 501 may be disposed in the corner region 505 (or the corner region 555 of the second surface 212), and the magnet 502 may be disposed in the corner region 509 (or the corner region 559 of the fourth surface 221) corresponding to the corner region 505 of the first surface 211.

Referring back to FIG. 4, the hall sensor 455 may be related to the first magnet and the second magnet among a plurality of magnets included in the electronic device 101. For example, the electronic device 101 may further include not only the first magnet and the second magnet, but also other magnets distinguished from the first magnet and the second magnet. In an embodiment, positions of the other magnets may be different from positions of the first magnet and positions of the second magnet. For example, referring to FIGS. 5 and 6A, unlike magnets 501 and 502 disposed in the corner region 503 and the corner region 507 respectively, some of the other magnets 521 may be disposed along edges 526 of the first surface 211 (or edges 528 of the second surface 212) spaced apart from the axis 237 among edges of the first surface 211 parallel to the axis 237; and unlike the magnet 501 and the magnet 502, magnets 522 disposed at positions corresponding to the positions of the magnets 521 may be disposed along edges 527 (or edges 529 of the fourth surface 222) of the third surface 221 corresponding to edges 526 of the first surface 211. For example, the magnets 521 may be disposed between the battery in the first housing 210 of the batteries 255 and the edge 526, the magnets 522 may be disposed between the battery in the second housing 220 of the batteries 255 and the edge 527. In an embodiment, the magnets 521 may be disposed such that a magnetic field from the magnets 521 does not affect the performance of at least one camera module 234. For example, the magnets 521 may be spaced apart from at least one camera module 234 so that the magnetic field does not affect the performance of at least one camera module 234. For example, the magnets 521 spaced apart from at least one camera 234 may be closer to the edge 531 of the second surface 212 than the edge 530 of the second surface 212 adjacent (e.g., or proximate) to the at least one camera module 234. Meanwhile, the positions of the magnets 522 may correspond to the positions of the magnets 521. However, it is not limited thereto.

In an embodiment, each of a magnet array including a magnet 501 and a magnet 502 and a magnet array including magnets 521 and 522, may be included in the electronic device 101 to maintain the fully folding state. For example, in order to maintain the fully folding state through an attractive magnetic force between the magnet 501 and the magnet 502 within the fully folding state, the polarity of the surface of the magnet 501 facing the magnet 502 in the completely folding state may be opposite to the polarity of the surface of the magnet 502 facing the magnet 501. For example, when the pole of the surface of the magnet 501 facing the magnet 502 in the fully folding state is N pole, the pole of Op the surface of the magnet 502 facing the magnet 501 in the fully folding state may be S pole. Meanwhile, when the pole of the surface of the magnet 501 facing the magnet 502 in the completely folding state is the N pole, the pole of the other surface of the magnet 501 facing the surface of the magnet 501 may be the S pole, and the other surface of the magnet 502 facing the surface of the magnet 502 may be the N pole. For example, in order to maintain the fully folding state through attractive magnetic force between magnets 521 and 522 in the fully folding state, some polarities of magnets 522 facing parts of magnets 521 in the fully folding state may be opposite to those of magnets 521. In an embodiment, the attractive force between the magnets 521 and 522 may be greater than the attractive force between the magnets 501 and 502. However, it is not limited thereto.

In one configuration, when viewed from above with the electronic device 101 in the unfolding state in which the flexible display panel 230 is removed, each of the magnet 501 and the magnets 521 may be exposed, and when the electronic device 101 in the unfolding state in which the display panel 235 and the rear plate 290 are removed is viewed from the top, covered by the first support member 270; When the electronic device 101 in the unfolding state from which the flexible display panel 230 is removed is viewed from above, each of the magnets 502 and 522 may be exposed, and when the electronic device 101 in the unfolding state from which the display panel 235 and the rear plate 290 are removed is viewed from the top, each of the same may be covered by the second support member 280. For example, referring to FIG. 6B, each of the magnet 501 and the magnets 521 is supported by a recess formed on the first support member 270 and is exposed to an exterior environment when viewed from above; and each of the magnets 502 and 522 may be supported by a recess formed on the second support member 280 and may be exposed to the outside when viewed from above. The polarity (e.g., N pole) of the surface of the magnet 501 facing the magnet 502 in the fully folding state may be opposite to the polarity (e.g., S pole) of the surface of the magnet 502 facing the magnet 501 in the fully folding state. The polarity of some of the magnets 521 facing some parts of the magnets 522 in the fully folding state may be opposite to the polarity of some of the magnets 522 in the fully folding state, the polarity of the other portion of the magnets 521 in contact with the portion of the magnets 521 may be opposite to the polarity of the portion of the magnets 521, the polarity of the other portion of magnets 522 in contact with the portion of magnets 522 may be opposite to the polarity of the portion of magnets 522. Meanwhile, the hall sensor 455 may be disposed adjacent (e.g., or proximate) to the magnet 501 of the magnets 502, the magnets 521, and the magnets 522 within the unfolding state, and may be covered by the first support member 270. For example, referring to FIG. 6C, each of the magnet 501 and the magnets 521 is formed on the first support member 270, supported by a recess facing the first surface 211, and covered by a surface of the first support member 270 facing the second surface 212 when viewed from above; and each of the magnets 502 and 522 may be formed on the second support member 280, supported by a recess facing the third surface 221, and covered by a surface of the second support member 280 facing the fourth surface 222 when viewed from above. Meanwhile, the hall sensor 455 may be adjacent (e.g., or proximate) to the magnet 501 among the magnet 501, the magnets 502, the magnets 521, and the magnets 522 within the unfolding state; and covered by a surface of the first PCB in the first housing 210 to which at least one camera module 234 is attached.

In an embodiment, each of magnet 501, magnet 502, magnets 521, and the magnets 522 may be disposed so as to be exposed when the electronic device 101 in the unfolding state with the display panel 235 and the rear plate 290 removed is viewed from above. For example, referring to FIG. 6D, each of the magnet 501 and the magnets 521 may be formed on the first support member 270 and supported by a recess facing the second surface 212 and is exposed to the outside when viewed from above; and each of the magnets 502 and 522 may be formed on the second support member 280 and supported by a recess facing the fourth surface 222 and exposed toward the outside when viewed from above. Meanwhile, the hall sensor 455 may be disposed adjacent (e.g., or proximate) to the magnet 501 of the magnets 502, the magnets 521, and the magnets 522 within the unfolding state and covered by a surface of the first PCB in the first housing 210 to which at least one camera module 234 is attached.

Referring back to FIG. 4, in an embodiment, the hall sensor 455 may be more adjacent (e.g., or proximate) to the first magnet than some of the other magnets in the first housing 210. For example, since the first PCB on which the hall sensor 455 is mounted includes an area closer to the first magnet than some of the other magnets, the hall sensor 455 may be closer to the first magnet than some of the other magnets. For example, referring to FIGS. 5 and 6, the hall sensor 455 may be closer to the magnet 501 than the magnets 521.

Referring back to FIG. 4, in an embodiment, the hall sensor 455 disposed under the first display area 231 may be spaced apart from at least one camera module 234. For example, at least one camera module 234 may include a camera module including a magnet causing a magnetic field that changes according to a photographing (or shooting) state (or the state of movement of at least one camera module 234). For example, the magnet may be included in the camera module, which is a wide-angle camera module, for optical image stabilization (OIS) function. For example, the magnet may be included in the camera module for enabling an auto focus function. However, it is not limited thereto. In an embodiment, the hall sensor 455 spaced apart from the camera module may be disposed at a position spaced apart from the magnetic field that changes according to the photographing state (or the moving state of the camera module). For example, the hall sensor 455 spaced apart from the camera module may be disposed at a position capable of identifying whether the state of the electronic device 101 is in the unfolding state or the folding state (e.g., the fully folding state) regardless of whether the magnetic field is changed. For example, referring to FIGS. 7A, 7B, and 8, the hall sensor 455 may be mounted on a surface 703 (shown in FIGS. 7A and 8) of the first PCB faced away a surface 702 (shown in FIGS. 7B and 8) of the first PCB (e.g., the first PCB) in the first housing 210 to which the camera module 701 is attached in order to allow the hall sensor 455 to be spaced apart from the camera module 701 (e.g., a wide-angle camera module) which is the camera module included in at least one camera module 234. In an embodiment, the hall sensor 455 spaced apart from the camera module 701 may be mounted on the surface 703 of the first PCB between the edge 704 (shown in FIG. 7A) (or an edge 705 (shown in FIG. 7B) adjacent (e.g., or proximate) to the magnet 501 among edges of the second surface 212 of the first housing 210 perpendicular to the axis 237) adjacent (e.g., or proximate) to the magnet 501 and the camera module 701 among edges of the first surface 211 of the first housing 210 perpendicular to the axis 237. In an embodiment, the hall sensor 455 disposed under the flexible display panel 230 may be disposed on a surface 703 that is disposed under the flexible display panel 230 (shown in FIG. 8), adjacent (e.g., or proximate) to the magnet 501 supported by the first support member 270 (shown in FIG. 8) in the first housing 210, and faced away from the surface 702 on which the camera module 701 is disposed. In an embodiment, the distance 706 (shown in FIGS. 7A and 7B) between a part of the camera module 701 and a part of the hall sensor 455 may be set in consideration of a range in which a magnetic field from at least one magnet 801 in the camera module 701 for providing OIS is changed according to the photographing state or the movement state of the camera module 701. In an embodiment, the distance 706 may be set to identify through the hall sensor 455 whether the state of the electronic device 101 is in the unfolding state or the folding state (e.g., the fully folding state), regardless of whether the magnetic field is changed. For example, the distance 706 may be set to be 20 mm or more. However, it is not limited thereto.

Referring back to FIG. 4, in an embodiment, at least one camera module 234 may further include another camera module that is distinguished from the camera module. For example, unlike the camera module, the other camera module may not include a magnet (e.g., a magnet for providing OIS) causing a magnetic field that changes according to a photographing state of the other camera (or a moving state of the other camera module). In other words, only the camera module among the camera module and the other camera module may include the magnet causing a magnetic field that changes according to a photographing state (or a movement state of the camera module). Since the other camera module does not include the magnet, the other camera module may not affect the hall sensor 455 used to identify whether the state of the electronic device 101 is in the unfolding state or the folding state (e.g., the fully folding state). As another example, the other camera module may include a magnet causing a magnetic field having a smaller change than a change in the magnetic field caused by the magnet in the camera module. Since the magnet in the other camera module causes a change in a magnetic field relatively smaller than that of the magnet in the camera module, the other camera module may not affect the hall sensor 455 used to identify whether the electronic device 101 is in the unfolding state or the folding state (e.g., the fully folding state). However, it is not limited thereto. In an embodiment, the hall sensor 455 may be disposed closer to the other camera module than the camera module. For example, referring to FIGS. 7A and 7B, the hall sensor 455 may be closer to a camera module 707 that is another camera module and is an ultra-wide camera module than the camera module 701. For example, the camera module 707 may be positioned between the hall sensor 455 and the camera module 701. For example, the distance 708 (shown in FIGS. 7A and 7B) between the hall sensor 455 and the camera module 707 may be shorter than the distance 706. However, it is not limited thereto.

Meanwhile, referring back to FIG. 4, because identifying whether the electronic device 101 is in the unfolding state or in the folding state (e.g., the fully folding state) via the hall sensor 455 utilizes a difference between data on the magnetic field obtained through the hall sensor 455 in the unfolding state and data on the magnetic field obtained through the hall sensor 455 in the folding state, the relative positional relationship between magnets used to identify the state of the electronic device 101 may need to be changed with respect to the hall sensor 455 according to the state of the electronic device 101. Since the first magnet and the second magnet change depending on whether the state of the electronic device 101 is in the unfolding state or the folding state (e.g., the fully folding state), they may be used to identify the state of the electronic device 101 through the hall sensor 455. For example, referring to FIG. 7C, since a relative positional relationship between the first magnet 501 and the second magnet 502 in the unfolding state is distinguished from a relative positional relationship between the magnet 501 and the magnet 502 in the folding state, the magnet 501 and the magnet 502 may be used to identify the state of the electronic device 101 through the hall sensor 455. Meanwhile, since the relative positional relationship between the magnet 501 and the hall sensor 455 is independently maintained from the change in the state of the electronic device 101, and the relative positional relationship between the magnet 502 and the hall sensor 455 is changed according to the change in the state of the electronic device 101, the state of the electronic device 101 may be identified based on a change in a relative position between the magnet 501 and the magnet 502 according to the state of the electronic device 101 and based on a change in a magnetic field caused based on a change in a relative position between the hall sensor 455 and the magnet 502 according to a state of the electronic device 101 through the hall sensor 455.

Referring back to FIG. 4, Identifying a difference between the magnetic field caused by the first magnet and the second magnet in the unfolding state and the magnetic field in the folding state (e.g., the fully folding state) may be utilized to identify whether the electronic device 101 is in the unfolding state or in the folding state (e.g., the fully folding state) using the hall sensor 455. In an embodiment, the Hall sensor 455 may be spaced more than a certain distance from the first magnet to identify the difference. For example, when the hall sensor 455 is disposed too close to the first magnet, the difference in the magnetic field may not be identified by the hall sensor 455 due to the first magnet, and thus the hall sensor 455 may be spaced apart from the first magnet by a certain distance or more. For example, referring to FIGS. 7A and 7B, the hall sensor 455 may be spaced apart from the magnet 501. For example, a distance 709 between a portion of the hall sensor 455 and a portion of the magnet 501 may be set to a length capable of identifying a difference in the magnetic field through the hall sensor 455. For example, the length may be 4 mm (millimeter). However, it is not limited thereto.

Referring back to FIG. 4, in an embodiment, illustrated in FIG. 2, the hall sensor 455, as shown in FIG. 2, may be spaced apart from at least one component of the electronic device 101 electrically connected to At least a part of a plurality of conductive members 226, at least a part of a plurality of conductive members 228, at least a part of a plurality of non-conductive members 227, and at least a part of a plurality of non-conductive members 229, at least one antenna structure or formed by a combination thereof. In an embodiment, the at least one component may include a plurality of antenna contacts (or a plurality of antenna connectors) electrically connected to the at least one antenna structure. In an embodiment, at least one electrical path extending from the hall sensor 455 for connection with components (e.g., the processor 120 shown in FIG. 1) of the electronic device 101 may be spaced apart from an electrical path connecting each of the plurality of antenna contacts to a communication module (e.g., communication module 190) of the electronic device 101. For example, referring to FIGS. 7A, 7B, and 9, the hall sensor 455 may be spaced apart from each of the antenna contact 711-2 and the antenna contact 711-3 in order to prevent or reduce malfunction of the hall sensor 455 caused by the antenna structure, which is in contact with the antenna contact 711-2 and the antenna contact 711-3 and is formed by the conductive member 226-3. The hall sensor 455 may be spaced apart from the antenna contact 711-1 in order to prevent or reduce malfunction of the hall sensor 455 caused by the antenna structure, which is in contact with the antenna contact 711-1 and is formed by the conductive member 226-4 electrically separated from the conductive member 226-3 by the non-conductive member 227-3. Each of a plurality of antenna contacts 711 including an antenna contact 711-1, an antenna contact 711-2, and an antenna contact 711-3 may be disposed on the surface 702 of the first PCB facing the surface 703 of the first PCB in the first housing 210 in which the hall sensor 455 is disposed.

For example, the hall sensor 455 may be spaced apart from the antenna contact 710 to prevent or reduce malfunction of the hall sensor 455 caused by the antenna structure, which is in contact with the antenna contact 710 and formed by the conductive member 226-3. In an embodiment, the antenna contact 710 may be adjacent (e.g., or proximate) to an edge 526 spaced apart from the axis 237 among edges of the first surface 211 parallel to the axis 237. In an embodiment, the antenna contact 710 may protrude from the surface 703 of the first PCB. In an embodiment, the antenna contact 710 may be configured with a C-clip protruding from the surface 703 of the first PCB. The antenna contact 710 implemented using the C-clip may be electrically coupled to the conductive member 226-3 physically connected to the upper surface of the C-clip. Since the C-clip is implemented using an elastic body, the electrical coupling between the conductive member 226-3 and the antenna contact 710 may be maintained by the elastic force of the C-clip. The antenna contact 710 implemented using the C-clip may electrically connect the antenna structure to the ground. However, it is not limited thereto.

For example, the hall sensor 455 may be spaced apart from each of the antenna contact 711-2 and the antenna contact 711-3 in order to prevent or reduce interference of signals received through the antenna contact 711-2 and the antenna contact 711-3 connected to the antenna structure formed by the conductive member 226-3 from the external electronic device; and spaced apart from the antenna contact 711-1 in order to prevent or reduce interference of a signal received from an external electronic device through an antenna contact 711-1 connected to an antenna structure formed by the conductive member 226-4 electrically separated from the conductive member 226-3 by the non-conductive member 227-3. Each of a plurality of antenna contacts 711 including an antenna contact 711-1, an antenna contact 711-2, and an antenna contact 711-3 may be disposed on the surface 702 of the first PCB facing the surface 703 of the first PCB in the first housing 210 in which the hall sensor 455 is disposed.

For example, the hall sensor 455 may be spaced apart from the antenna contact 710 to prevent or reduce interference with a signal received through the antenna contact 710 connected to the antenna structure formed by the conductive member 226-3. The antenna contact 710 may be disposed on the surface 703 of the first PCB in the first housing 210 on which the hall sensor 455 is disposed. In an embodiment, the antenna contact 710 may connect the antenna structure with a communication module of the electronic device 101.

Although not illustrated in FIGS. 7A, 7B, and 9, the hall sensor 455 may be electrically separated or spaced apart from an electrical path from each of the antenna connectors 710 or a plurality of antenna contacts 711 in order to prevent or reduce interference with a signal provided to the communication module of the electronic device 101 through an electrical path from each of the antenna contacts 710 or a plurality of antenna contacts 711. For example, the hall sensor 455 may be disposed at a position capable of electrically separating the electrical path extending from the hall sensor 455 from each of the antenna contacts 710 or a plurality of antenna contacts 711.

Referring back to FIG. 4, at least one component of the electronic device 101 protruding from one surface of the first PCB in the first housing 210 may be pressed by the at least one other component of the electronic device 101 to form an electrical connection (or electrical coupling) with at least one other component of the electronic device 101. When the hall sensor 455 is disposed at a position corresponding to a position of the at least one component on the other surface of the first PCB opposite from the one surface of the first PCB on which the at least one component is disposed, the hall sensor 455 may be disposed within a position within the other surface of the first PCB, which is distinguished from a position within the one surface of the first PCB on which the at least one component of the electronic device 101 is disposed, Since the hall sensor 455 may be affected by a force caused by pressing the at least one component of the electronic device 101 by the at least one other component of the electronic device 101. For example, the hall sensor 455 may be located within a position where the influence from the force is reduced. In an embodiment, the hall sensor 455 disposed on the other surface of the first PCB may be disposed at a position located within an area within the one surface of the first PCB on which the hall sensor 455 is mounted and protruding from the first PCB and distinguished from positions at which a plurality of antenna contacts is disposed. For example, referring to FIGS. 7A, 7B, and 9, the hall sensor 455 may be disposed at a position on the surface 703 of the first PCB, which is distinguished from a position where each of the plurality of antenna contacts 711 coupled on the surface 702 of the first PCB on which the hall sensor 455 is mounted. In an embodiment, each of the plurality of antenna contacts 711 may be contacted to the first PCB along an edge 712 of the first PCB adjacent (e.g., or proximate) to an edge 704 (shown in FIG. 7A) adjacent (e.g., or proximate) to a magnet 501 among edges of the first surface 211 of the first housing 210 perpendicular to the axis 237 or adjacent (e.g., or proximate) to an edge 705 (shown in FIG. 7B) adjacent (e.g., or proximate) to the magnet 501 among edges of the second surface 212 of the first housing 210 perpendicular to the axis 237. In an embodiment, a plurality of antenna contacts 711 may be spaced apart from each other. In an embodiment, each of a plurality of antenna contacts 711 may be a component that electrically connects the at least one antenna structure to the communication module (e.g., the wireless communication module 192 shown in FIG. 1) of the electronic device 101 by physically contacting at least one the antenna structure formed by at least a portion of a plurality of conductive members 226, at least a portion of a plurality of non-conductive members 227, or combinations thereof; and electrically connects the ground to the at least one antenna structure. For example, the antenna contacts 711-1 may electrically connect the antenna structure formed by the conductive member 226-4 to the communication module by physically contacting the antenna structure formed by the conductive member 226-4 and each of the antenna contact 711-2 and the antenna contact 711-3 may electrically connect the antenna structure formed by the conductive member 226-3 to the communication module by physically contacting the antenna structure formed by the conductive member 226-3 electrically separated from the conductive member 226-4 by the non-conductive member 227-3. In an embodiment, the antenna contact 711-1 may electrically connect the antenna structure formed by the conductive member 226-4 to the ground and each of the antenna contact 711-2 and the antenna contact 711-3 may electrically connect the antenna structure formed by the conductive member 226-3 electrically separated from the conductive member 226-4 by the non-conductive member 227-3 to the ground. In an embodiment, each of a plurality of antenna contacts 711 may protrude from the surface 702 (see FIGS. 7B and 9) of the first PCB. In an embodiment, the Hall sensor 455 may be disposed at a location on the surface 703 of the first PCB that is distinct from a location on the surface 702 of the first PCB where each of the plurality of antenna contacts 711 is disposed to prevent force caused by pressing each of a plurality of antenna contacts 711 protruding from the surface 702 of the first PCB from being transmitted to the hall sensor 455. In an embodiment, the hall sensor 455 may be disposed between an edge of the camera module 701 closest to the edge 712 of the first PCB and parallel to the edge 712 of the first PCB and a plurality of antenna contacts 711.

Referring back to FIG. 4, the hall sensor 455 may be disposed at a position where a difference between the first value for indicating the magnitude of the magnetic flux density obtained through the hall sensor 455 within a position that does not cause a decrease in the performance of the at least one component and the unfolding state and the second value for indicating the magnitude of the magnetic flux density obtained through the hall sensor 455 in the folding state (e.g., the complete folding state) is greater than a reference value, as well as a position on the first PCB in which an impact caused by the pressing of at least one component of the electronic device 101 disposed around the hall sensor 455 is transmitted to be less than a reference size. For example, referring to FIG. 10, considering the remaining mounting space on the first PCB and the distance between the camera module 701 (not shown in FIG. 10) and the hall sensor 455 (e.g., distance 706 (shown within FIGS. 7A and 7B)), the hall sensor 455 may be disposed at a candidate position 1001 on the surface 703 of the first PCB, a candidate position 1002 on the surface 703 of the first PCB, a candidate position 1003 on the surface 703 of the first PCB, and a candidate position 1004 on the surface 703 of the first PCB, a candidate position 1005 on the surface 702 of the first PCB, or a candidate position 1006 on the surface 702 of the first PCB.

For example, when the hall sensor 455 is disposed on the candidate position 1001 on the surface 703 of the first PCB, since the hall sensor 455 is adjacent (e.g., or proximate) to the magnet 501, a difference between the first value and the second value obtained through the hall sensor 455 may be smaller than the reference value. Since the difference between the first value and the second value is smaller than the reference value, it may be inappropriate to identify whether the electronic device 101 is in the unfolding state or in the folding state (e.g., in the fully folding state) through the hall sensor 455 disposed on the candidate position 1001 on the surface 703 of the first PCB.

For another example, when the hall sensor 455 is disposed on the candidate position 1002 on the surface 703 of the first PCB, since the hall sensor 455 faces at least a portion of the antenna contact 710 protruding from the surface 702 of the first PCB through the first PCB, the hall sensor 455 disposed on the candidate position 1002 on the surface 703 of the first PCB may be affected by a force caused by the antenna contact 710 being pressed to form an electrical coupling with other components of the electronic device 101. Since the hall sensor 455 may be damaged by force (e.g., an impact), it may be inappropriate to dispose the hall sensor 455 on the candidate position 1002 on the surface 703 of the first PCB.

As another example, since the candidate position 1003 on the surface 703 of the first PCB is a position where an electrical path from the antenna contact 710 passes within the first PCB, when the hall sensor 455 is disposed on the candidate position 1003 on the surface 703 of the first PCB, performance of the antenna structure may be degraded. Due to the potential decrease in performance, it may be inappropriate to arrange the hall sensor 455 on the candidate position 1003 on the surface 703 of the first PCB.

For another example, when the hall sensor 455 is disposed on the candidate position 1004 on the surface 703 of the first PCB, a difference between the first value and the second value obtained through the hall sensor 455 may be smaller than the reference value. Since the difference between the first value and the second value is smaller than the reference value, it may be inappropriate to identify whether the electronic device 101 is in the unfolding state or in the folding state (e.g., in the fully folding state), when the hall sensor 455 disposed on the candidate position 1004 on the surface 703 of the first PCB.

For another example, since the candidate position 1005 on the surface 702 of the first PCB is a position through which an electrical path for the antenna contact 710 passes, at least one wiring in the first PCB connected to the hall sensor 455 disposed on the candidate position 1005 on the surface 702 of the first PCB may degrade performance of the antenna structure. Due to the potential decrease in performance, it may be inappropriate to arrange the hall sensor 455 on the candidate position 1005 on the surface 702 of the first PCB. Meanwhile, the surface 702 of the first PCB may include a connection part 1010-1 and a connection part 1010-2 on the first PCB connecting the antenna contact 711-3, a connection part 1010-3 and a connection part 1010-4 on the first PCB connecting the antenna contact 711-2, and a connection portion 1010-5 on the first PCB connecting the antenna contact 711-1.

As another example, since the candidate position 1006 on the surface 702 of the first PCB is spaced apart from each of a plurality of antenna contacts 711 and from the antenna contact 710 and from an electrical path for a signal provided to the communication module of the electronic device 101 through the antenna contact 710, and from an electrical path for a signal provided to the communication module of the electronic device 101 through each of a plurality of antenna contacts 711, the hall sensor 455 disposed on the candidate position 1006 on the surface 702 of the first PCB may not affect the performance of at least one antenna structure connected to each of the plurality of antenna contacts 711 and the antenna contact 710. For example, the hall sensor 455 disposed on the candidate position 1006 on the surface 702 of the first PCB may prevent or reduce interference with a signal provided to the communication module through the at least one antenna structure connected to each of a plurality of antenna contacts 711 and antenna contacts 710. Since the difference between the first value obtained through the hole sensor 455 disposed on the candidate position 1006 on the surface 702 of the first PCB in the unfolding state and the second value obtained through the hole sensor 455 disposed on the candidate position 1006 on the surface 702 of the first PCB in the folding state (e.g., the fully folding state) is greater than the reference value, the hall sensor 455 disposed on the candidate position 1006 on the surface 702 of the first PCB may be used to identify whether the state of the electronic device 101 is in the unfolding state or in the folding state (e.g., the fully folding state).

Referring back to FIG. 4, the performance of the hall sensor 455, as used to identify whether the state of the electronic device 101 is the unfolding state or the folding state (e.g., the fully folding state), may be degraded by one or more components (e.g., wiring for the power signal among power signals and control signals generated in the electronic device 101) of the electronic device 101 that generate magnetic force drift, are located around the hall sensor 455, and shield another magnetic body located around the hall sensor 455 and/or a magnetic force (e.g., magnetic force caused by the first magnet and the second magnet) located around the hall sensor 455 and directed toward the hall sensor 455. In an embodiment, in order to prevent a degradation in performance of the hall sensor 455, the hall sensor 455 may be spaced apart from components of the electronic device 101 that cause the magnetic force drift, the other magnetic body, and components of the electronic device 101 shielding the magnetic force toward the hall sensor 455.

In an embodiment, to prevent a degradation in performance of the hall sensor 455 used to identify whether the state of the electronic device 101 is in the unfolding state or the folding state (e.g., the fully folding state), a partial region of the first PCB located around the hall sensor 455 may include at least one layer including a non-electric material. For example, referring to FIG. 11, in an embodiment, at least one layer in a partial region 1101 of the first PCB positioned between the hall sensor 455 mounted on the surface 702 of the first PCB and the antenna contact 710 may include a non-electric material. For example, a partial region 1101 of the first PCB may include a fill cut region (or an ungrounded region). At least one layer in a partial region 1102 of the first PCB positioned between the hall sensor 455 mounted on the surface 702 of the first PCB and a plurality of antenna contacts 711 may include a non-electric material. For example, a partial region 1102 of the first PCB may include a fill cut region (or an ungrounded region). However, it is not limited thereto.

Although not illustrated in FIGS. 5 to 11 (FIG. 5, 6A, 6B, 6C, 6D, 7A, 7B, 7C, 8, 9, 10, 11), in an embodiment, the hall sensor 455 may relate to magnets 521 (shown in FIGS. 5 and 6A to 6D) and magnets 522 (shown in FIGS. 5A to 6D). In an embodiment, when the hall sensor 455 is related to the magnets 521 and 522 and mounted within the first housing 210, the hall sensor 455 may be spaced apart from the magnets 521 and adjacent (e.g., or proximate) to the magnets 521. In an embodiment, the hall sensor 455 adjacent (e.g., or proximate) to the magnets 521 may be spaced apart from at least one antenna contact electrically coupled to the antenna structure formed by the conductive member 226-2. In an embodiment, the hall sensor 455 adjacent (e.g., or proximate) to the magnets 521 may be spaced apart from at least one antenna contact, which is electrically separated from the antenna structure formed by the conductive member 226-2 by the non-conductive member 227-1 and electrically coupled to the antenna structure formed by the conductive member 226-1. However, it is not limited thereto.

Referring back to FIG. 4, in an embodiment, the hall sensor 455 may be included in the second housing 22 including the display panel 235 exposed through a part of the fourth surface 222 instead of the first housing 210 including at least one camera module 234 exposed through a portion of the second surface 212. In an embodiment, the hall sensor 455 in the second housing 220 may be adjacent (e.g., or proximate) to the second magnet in the second housing 220 and may be spaced apart from the second magnet.

For example, referring to FIG. 12, the hall sensor 455 may be mounted on the surface 1201 of the second PCB in the second housing 220 facing the fourth surface 222 (shown in FIG. 2A). In one configuration, the hall sensor 455 mounted on the surface 1201 of the second PCB may be supported by a recess in the second support member 280 and may be adjacent (e.g., or proximate) to the magnet 502 exposed when the electronic device 101 removed the display panel 235 is viewed from the top, and may be spaced apart from the magnet 502. In an embodiment, the magnet 501 may be disposed at a position corresponding to the position of the magnet 502, and may be exposed when the electronic device 101 from which the display panel 235 is removed is viewed from above. In an embodiment, the hall sensor 455 mounted on the surface 1201 of the second PCB may be supported by a recess in the second support member 280 and spaced apart from the magnets 522 disposed along the edge of the second housing 220 parallel to the axis 237. For example, the distance between the hall sensor 455 and the magnet 502 may be shorter than the distance between the hall sensor 455 and the magnets 522. In one configuration, the magnets 521 may be disposed at positions corresponding to the positions of the magnets 522, and may be exposed when the electronic device 101 from which the display panel 235 is removed is viewed from above. According to embodiments, the magnet 501, the magnet 502, the magnets 521, and the magnets 522 may be disposed as shown in FIG. 6C. Meanwhile, although not shown in FIGS. 12 and 13, according to embodiments, the hall sensor 455 may be mounted on the other surface of the second PCB that is separated while facing the surface 1201 of the second PCB.

In an embodiment, the hall sensor 455 may be disposed between the edge adjacent (e.g., or proximate) to the magnet 502 among edges of the second housing 220 perpendicular to the axis 237 and at least one camera module projected (reflected, or mirrored) onto the second housing 220 when the state of the electronic device 101 is in the fully folding state.

In an embodiment, the Hall sensor 455 may be spaced apart from each of the plurality of antenna contacts 1211 disposed along at least some of the edges of the second PCB. For example, referring to FIG. 13, The hall sensor 455 may be spaced apart from the antenna contact 1211-1, which is electrically connected, in contact with the antenna structure formed by the conductive member 228-4. For example, the hall sensor 455 may be spaced apart from each of the antenna contact 1211-2 and the antenna contact 1211-3, which may be electrically connected, in contact with an antenna structure formed by the conductive member 228-3 electrically separated from the conductive member 228-4 by a non-conductive member 229-3. In an embodiment, a plurality of antenna contacts 1211 may have the same or similar functions as the functions of a plurality of antenna contacts 711 described above. In an embodiment, a plurality of antenna contacts 1211 may be disposed along an edge closest to the hall sensor 455 from among edges of the second housing 220 perpendicular to the axis 237. In an embodiment, a plurality of antenna contacts 1211 may be disposed on the surface 1201 of the second PCB on which the hall sensor 455 is disposed. Although not shown in FIGS. 12 and 13, the plurality of antenna contacts 1211 may be disposed on the other surface of the second PCB facing and separated from the surface 1201 of the second PCB on which the Hall sensor 455 is disposed. In other words, the hall sensor 455 may be disposed on a surface of the second PCB that is in contact with a plurality of antenna contacts 1211, or may be disposed on a surface opposite to a surface of the second PCB in contact with a plurality of antenna contacts 1211.

Meanwhile, although not shown in FIGS. 12 and 13, an antenna contact that is in contact with the antenna structure formed by the conductive member 228-3 and is electrically connected may be disposed along an edge spaced apart from the axis 237 among edges of the second housing 220 parallel to the axis 237. The hall sensor 455 may be spaced apart from the antenna contact. In an embodiment, the antenna contact may have the same or similar function as the function of the antenna contact 710 described above. In an embodiment, the antenna contact may be disposed on the surface 1201 of the second PCB. In an embodiment, the antenna contact may be disposed on another surface of the second PCB opposite to the surface 1201 of the second PCB. In other words, the hall sensor 455 may be disposed on a surface of the second PCB in contact with the antenna contact, or may be disposed on a surface opposite to a surface of the second PCB in contact with the antenna contact.

Meanwhile, although not illustrated in FIGS. 12 and 13, a partial region of the second PCB positioned around the hall sensor 455 may include at least one layer including a non-dielectric material to prevent a decrease in performance of the hall sensor 455. For example, at least one layer in a partial region of the second PCB positioned between the hall sensor 455 mounted on the surface 1201 (or a surface opposite to the surface 1201 of the second PCB) of the second PCB and a plurality of antenna contacts 1211 may include a non-electric material. For example, at least one layer in a partial region of the second PCB positioned between the hall sensor 455 mounted on the surface 1201 (or a surface opposite to the surface 1201 of the second PCB) of the second PCB and the antenna contact may include a non-dielectric material. For example, the partial region of the second PCB may include a fill cut region (or an ungrounded region). However, it is not limited thereto.

Referring back to FIG. 4. using the hall sensor 455 illustrated through FIGS. 5 to 13 and descriptions thereof, processor 120 may obtain data on magnetic flux density from the first magnet and the second magnet, and based on the data, may identify whether electronic device 101 is in the unfolding state or in the folding state (e.g., the fully folding state).

In an embodiment, processor 120 may identify a change in magnetic flux density in a direction parallel to axis 237 from the data, and may identify whether electronic device 101 is in the unfolding state or in the folding state based on the identified change. In an embodiment, processor 120 may identify a change in magnetic flux density in a direction perpendicular to axis 237 from the data, and may identify whether electronic device 101 is in the unfolding state or in the folding state based on the identified change. In an embodiment, the processor 120 may identify a change in magnetic flux density from the data in a first direction facing the first surface 211 of the first housing 210 or in a second direction opposite to the first direction and may identify whether the electronic device 101 is in the unfolding state or in the folding state based on the identified change. However, it is not limited thereto.

In an embodiment, processor 120 may identify whether the state of electronic device 101 is switched from the unfolding state by comparing the data with the first reference data while the state of the electronic device 101 is in the unfolding state, and may identify whether the state of the electronic device 101 is switched from the complete folding state by comparing the data with the second reference data distinguished from the first reference data while the state of the electronic device 101 is in the folding state. Since a relative positional relationship between the first magnet and the second magnet in the unfolding state is different from a relative positional relationship between the first magnet and the second magnet in the fully folding state, the processor 120 may identify the transition of the state of the electronic device 101 using the first reference data while the electronic device 101 is in the unfolding state and may identify the transition of the state of the electronic device 101 using the second reference data while the electronic device 101 is in the fully folding state. However, it is not limited thereto.

In an embodiment, when an angle between the first surface 211 of the first housing 210 and the third surface 221 of the second housing 220 may be identified through the hall sensor 455 based on a change in magnetic flux density caused by the first magnet and the second magnet, the processor 120 may identify an angle between the first surface 211 of the first housing 210 and the third surface 221 of the second housing 220 by comparing the data with the third reference data while the state of the electronic device 101 is switched from the unfolding state, and may identify an angle between the first surface 211 of the first housing 210 and the third surface 221 of the second housing 220 by comparing the data with fourth reference data distinguished from the third reference data while the state of the electronic device 101 is switched from the full folding state. For example, since a distribution of a change that changes according to the transition from the unfolding state to the fully folding state in magnetic flux density caused by the first magnet and the second magnet and a distribution of a change that changes according to the transition from the fully folding state to the unfolding state in magnetic flux density may be different from each other, the processor 120 may identify an angle between the first surface 211 of the first housing 210 and the third surface 221 of the second housing 220 using the third reference data while the state of the electronic device 101 is switched from the unfolding state, and may identify an angle between the first surface 211 of the first housing 210 and the third surface 221 of the second housing 220 using the fourth reference data while the state of the electronic device 101 is switched from the fully folding state. However, it is not limited thereto.

In an embodiment, the processor 120 may correct the data obtained through the hall sensor 455 and identify whether the state of the electronic device 101 is the unfolding state or the folding state based on the corrected data. For example, when the magnetic flux density caused by the first magnet and the second magnet changes over time, the data obtained through the hall sensor 455 may reflect the state of the electronic device 101 differently from the actual state. To prevent misidentification caused by a difference between the state of the electronic device 101 indicated by the data and the actual state of the electronic device 101, the processor 120 may obtain data obtained through the hall sensor 455 as reference data while identifying that the state of the electronic device 101 is within the fully folding state through the illuminance sensor (e.g., an illuminance sensor in the sensor module 176 shown in FIG. 1) of the electronic device 101. The processor 120 may correct the data based on the reference data and identify the state of the electronic device 101 based on the corrected data, thereby maintaining the performance of the identification through the hall sensor 455 even if the magnetic flux density from the first magnet and the second magnet changes over time. However, it is not limited thereto.

As illustrated through FIGS. 4 to 13, and descriptions thereof, in order to prevent the corner region (e.g., the corner region 507 shown in FIG. 5) of the third surface 221 from being spaced apart from the corner region (e.g., the corner region 503 shown in FIG. 5) of the first surface 211, the electronic device 101 may identify the state of the electronic device 101 using an array of magnets mounted in the electronic device 101 and a hall sensor 455 used to identify a change in magnetic force caused by the array of magnets. In an embodiment, since the hall sensor 455 is adjacent (e.g., or proximate) to one of the magnets, the hall sensor 455 may maintain a magnetized state even when a situation related to the electronic device 101 is changed. In an embodiment, since the hall sensor 455 is spaced apart from the camera module in the electronic device 101 causing a magnetic field that changes according to the photographing state, hall sensor 455 may be used to identify the state of electronic device 101 within a state in which the influence from the operation of the camera module is reduced. In an embodiment, the hall sensor 455 may be robust from impact because it protrudes from the PCB in the electronic device 101 and is spaced apart from a plurality of antenna contacts pressed by other components of the electronic device 101. In an embodiment, since the hall sensor 455 is spaced apart from the plurality of antenna contacts, the hall sensor 455 may reduce or prevent degradation of performance of the hall sensor 455 or malfunction of the hall sensor 455 caused by the antenna structure formed by the conductive member in contact with the plurality of antenna contacts. In an embodiment, since the hall sensor 455 is located within another area on the PCB distinct from the area on the PCB in which the electrical path from the plurality of antenna contacts is formed, the hall sensor 455 may reduce or prevent a decrease in performance of the antenna structure related to the plurality of antenna contacts. In an embodiment, since the hall sensor 455 is spaced apart from the wiring for the power signal, the hall sensor 455 may prevent the magnetic force drift from affecting the hall sensor 455. In an embodiment, since magnets interlocked with the hall sensor 455 are disposed in a corner area (e.g., a corner area 503) of the first surface 211 and a corner area (e.g., a corner area 507) of the third surface 221 respectively, the electronic device 101 may prevent a dead zone in which performance of recognizing a stylus pen is reduced through the electromagnetic induction panel 401 included in the electronic device 101.

As described above, the electronic device (e.g., the electronic device 101) according to an embodiment may include a first surface (e.g., a first surface 211) and a first housing (e.g., first housing 210) including a first surface and a second surface (e.g., a second surface 212) opposite from the first surface, a second housing (e.g., the second housing 220) including a third surface (e.g., the third surface 221) and a fourth surface (e.g., the fourth surface 222) opposite from the third surface, a folding housing (e.g., folding housing 265) rotatably connecting a side surface of the second housing facing a side surface of the first surface and a side surface of the first surface with respect to a folding axis, a flexible display panel (e.g., flexible display 230) disposed across the folding housing on the first surface and the third surface, a printed circuit board (PCB) in the first housing, A camera module (e.g., a camera module 701) attached to the PCB, partially exposed through a part of the second surface, and including a magnet, a first magnet (e.g., magnet 501) in the first housing, disposed along an edge spaced apart from the folding axis among edges of the first surface parallel to the folding axis, the second magnet (e.g., magnet 502) in the second housing disposed at a position corresponding to the position of the first magnet, a hall sensor mounted on the PCB, spaced apart from the camera module, and disposed between the camera module and an edge of the first side perpendicular to the folding axis adjacent (e.g., or proximate) the first magnet (Example: Hall sensor 455). In an embodiment, the first magnet may be disposed in one (a) corner area (e.g., a corner area 503) spaced apart from the folding axis among corner areas of the first surface.

In an embodiment, the electronic device may be disposed under at least a portion of the flexible display panel, and may further include an electromagnetic induction panel, configured to receive input from a stylus pen including a coil.

In an embodiment, the electronic device may further include at least one processor operatively coupled to the Hall sensor and disposed within the first housing or the second housing; wherein the at least one processor is configured to: obtain, through the hall sensor, data regarding change of magnetic flux density from the second magnet; and identify, based on the data, whether the electronic device is in an unfolding state in which a first direction the first surface faces corresponds to a second direction the third surface faces or in a folding state distinct from the unfolding state.

In an embodiment, the electronic device may further include a plurality of antenna contacts (e.g., a plurality of antenna contacts 711), adjacent (e.g., or proximate) to the periphery that is adjacent (e.g., or proximate) to the first magnet from among the peripheries of the first surface perpendicular to the folding axis, attached to the PCB along a periphery of the PCB, the plurality of antenna contacts spaced apart from each other; wherein the hall sensor may be spaced apart from the plurality of antenna contacts. In an embodiment, the hall sensor may be disposed between the plurality of antenna contacts and the camera module.

In an embodiment, the electronic device may further include an antenna contact (e.g., antenna contact 710) on the PCB, adjacent (e.g., or proximate) to a periphery of the PCB that is adjacent (e.g., or proximate) to the periphery of the first surface spaced apart from the folding axis from among the peripheries of the first surface parallel to the folding axis, attached to the PCB; wherein the hall sensor may be spaced apart from the antenna contact. In an embodiment, the hall sensor may be mounted on another area of the PCB, which is distinguished from an area of the PCB in which an electrical path extending from the antenna contact is formed.

In an embodiment, the electronic device may further include another camera module disposed between the camera module and the hall sensor, at least partially exposed through another portion of the second surface, the other camera mounted on the PCB; wherein the camera module from among the camera module and the other camera module may be configured to provide optical image stabilization (OIS) according to a state of a movement of the camera module.

In an embodiment, the hall sensor and the camera module may be disposed at a distance to reduce interference of the hall sensor by magnetism of the magnet in the camera module being moved for an optical image stabilization (OIS) function.

In an embodiment, the electronic device further may include third magnets in the first housing, adjacent (e.g., or proximate) to the periphery of the first surface spaced apart from the folding axis from among the peripheries of the first surface parallel to the folding axis, spaced apart from the first magnet; and fourth magnets in the second housing disposed in positions respectively corresponding to positions of the third magnets and an attractive force between the third magnets and the fourth magnets may be greater than an attractive force between the first magnet and the second magnet.

In an embodiment, the processor may be configured to: identify, while a state of the electronic device is an unfolding state in which a first direction the first surface faces corresponds to a second direction the third surface faces, whether the state of the electronic device is switched from the unfolding state or not, by comparing data regarding change of magnetic flux density from the second magnet with first reference data; and identify, while the state of the electronic device is a fully folding state in which at least portion of the first surface is in contact with at least portion of the third surface, whether the state of the electronic device is switched from the fully folding state or not, by comparing the data with second reference data distinct from the first reference data.

In an embodiment, the processor may be configured to: identify, while a state of the electronic device is switched from an unfolding state in which a first direction the first surface faces corresponds to a second direction the third surface faces, angle between the first surface and the third surface, by comparing data regarding change of magnetic flux density from the second magnet with first reference data; and identify, while the state of the electronic device is switched from a fully folding state in which at least portion of the first surface is in contact with at least portion of the third surface, the angle of the first surface and the third surface by comparing the data with second reference data distinct from the first reference data.

In an embodiment, the processor may be configured to identify a change in magnetic flux density in a direction parallel to the folding axis from the data, based on the identified change, and identify whether the electronic device is in the unfolding state or in the folding state.

In an embodiment, the processor may be configured to identify a change in magnetic flux density in a direction perpendicular to the folding axis from the data and identify whether the electronic device is in the unfolding state or in the folding state, based on the identified change.

In an embodiment, the processor may be configured to identify a change in magnetic flux density in the first direction or the second direction from the data and based on the identified change, identify whether the electronic device is in the unfolding state or in the folding state.

In an embodiment, each of the first magnet, the second magnet, and the hall sensor may be disposed under the flexible display panel.

In an embodiment, the PCB may include a plurality of layers, and the hall sensor may be mounted on a layer closest to the first surface among the plurality of layers.

In an embodiment, the electronic device may include a first housing including a first surface and a second surface faced away the first surface, a second housing including a third surface and a fourth surface faced away the third surface, a folding housing pivotably connecting a side surface of the first housing and a side surface of the second housing facing the side surface of the first housing based on a folding axis, a flexible display panel disposed on the first surface and the third surface across the folding housing, a printed circuit board (PCB) in the first housing, a plurality of antenna contacts, adjacent (e.g., or proximate) to a periphery of the first surface that is adjacent (e.g., or proximate) to the first magnet from among peripheries of the first surface perpendicular to the folding axis, attached to the PCB, the plurality of antenna contacts spaced apart from each other, a first magnet in the first housing disposed along a periphery of the first surface spaced apart from the folding axis from among peripheries of the first surface parallel to the folding axis, a second magnet in the second housing disposed in a position corresponding to a position of the first magnet and a hall sensor, spaced apart from each of the plurality of antenna contacts, spaced apart from the first magnet, the hall sensor mounted on the PCB. In an embodiment, the first magnet may be disposed in one (a) corner region (e.g., corner region 503) spaced apart from the folding axis among corner regions of the first surface.

In an embodiment, the electronic device further may include an antenna contact on the PCB, mounted on the PCB, adjacent (e.g., or proximate) to a periphery of the PCB that is adjacent (e.g., or proximate) to the periphery of the first surface spaced apart from the folding axis from among the peripheries of the first surface parallel to the folding axis; and the hall sensor may be spaced apart from the antenna contact.

In an embodiment, the electronic device may further include a camera module attached to the PCB, partially exposed through a part of the second surface, and including a magnet and the hall sensor may be spaced apart from the camera module and may be disposed between an edge adjacent (e.g., or proximate) to the first magnet among edges of the first surface perpendicular to the folding axis and the camera module.

In an embodiment, the electronic device may include a first housing including a first surface and a second surface faced away the first surface; a second housing including a third surface and a fourth surface faced away the third surface; a folding housing pivotably connecting a side surface of the first housing and a side surface of the second housing facing the side surface of the first housing based on a folding axis; a flexible display panel disposed on the first surface and the third surface across the folding housing; a first printed circuit board (PCB) in the first housing; a second PCB in the second housing; a camera module, mounted on the first PCB, at least partially exposed through portion of the second surface, the camera module including a magnet; a first magnet in the first housing, disposed along a periphery of the first surface spaced apart from the folding axis from among peripheries of the first surface parallel to the folding axis; a second magnet in the second housing disposed in a position corresponding to a position of the first magnet; a plurality of antenna contacts, adjacent (e.g., or proximate) to a periphery of the third surface that is adjacent (e.g., or proximate) to the second magnet from among peripheries of the third surface perpendicular to the folding axis, spaced apart from each other; and a hall sensor, mounted on the second PCB, spaced apart from each of the plurality of antenna contacts, the hall sensor spaced apart from the second magnet. In an embodiment, the first magnet may be disposed in one (a) corner region (e.g., corner region 503) spaced apart from the folding axis among corner regions of the first surface.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A foldable electronic device comprising:
a housing including:
   a first housing part, and
   a second housing part rotatably coupled with the first housing part;
a flexible display;
a first magnet disposed under a first corner area of the flexible display that is positioned on the first housing part;
a second magnet disposed under a second corner area of the flexible display that is positioned on the second housing part and overlaps the first corner area of the flexible display in a folded state of the foldable electronic device, wherein the first magnet and the second magnet are configured to maintain the folded state of the foldable electronic device through an attractive magnetic force between the first magnet and the second magnet;
a first camera disposed in the first housing part;
a second camera, configured with optical image stabilization (OIS), disposed in the first housing part; and
a hall sensor, disposed in the first housing part, configured to generate data for identifying whether a state of the foldable electronic device corresponds to an unfolded state of the foldable electronic device or the folded state of the foldable electronic device based on a magnetic field to be caused by the first magnet and the second magnet,
wherein a distance between the first magnet and the hall sensor is smaller than a distance between the first magnet and the first camera, and
wherein a distance between the hall sensor and the first camera is smaller than a distance between the hall sensor and the second camera.

2. The foldable electronic device of claim 1, wherein the first housing part includes:
a first periphery portion substantially perpendicular to an axis of the second housing part for rotating with respect to the first housing part; and
a second periphery portion, substantially perpendicular to the first periphery portion, substantially parallel to the axis, wherein the first periphery portion of the first housing part and the second periphery portion of the first housing part join each other at the first corner area,
wherein the hall sensor is disposed between the second camera in the first housing part and the first periphery portion of the first housing part.

3. The foldable electronic device of claim 2, wherein the hall sensor is disposed between the first camera in the first housing part and the first periphery portion of the first housing part.

4. The foldable electronic device of claim 3, wherein the second camera among the first camera and the second camera has an OIS mechanism,
wherein the hall sensor is spaced apart from the second camera such that whether the state of the foldable electronic device corresponds to the unfolded state of the foldable electronic device or the foldable state of the foldable electronic device is identified independently of changes in a magnetic field caused from the second camera in the first housing part, and
wherein the changes in the magnetic field from the second camera are to be caused according to the OIS mechanism of the second camera.

5. The foldable electronic device of claim 3, further comprising:
a printed circuit board (PCB) disposed in the first housing part,
wherein the first camera and the second camera are attached to the PCB to face in a first direction, and
wherein the hall sensor is mounted on a side of the PCB facing in a second direction opposite to the first direction.

6. The foldable electronic device of claim 5, further comprising:
antenna contacts, spaced apart from each other, disposed along the first periphery portion of the first housing part,
wherein the first periphery portion of the first housing part includes a lateral conductive portion configured to function as an antenna radiator,
wherein each of the antenna contacts is contacted on both the PCB and the lateral conductive portion included in the first periphery portion of the first housing part to electrically connect the PCB to the lateral conductive portion included in the first periphery portion of the first housing part, and
wherein the hall sensor is spaced apart from each of the antenna contacts.

7. The foldable electronic device of claim 6, wherein the antenna contacts are disposed on another side of the PCB that is opposite to the side of the PCB on which the hall sensor is mounted.

8. The foldable electronic device of claim 6, wherein the hall sensor is disposed between the second camera and a virtual line connecting the antenna contacts.

9. The foldable electronic device of claim 6, wherein the hall sensor is spaced apart from the antenna contacts to reduce a malfunction of the hall sensor.

10. The foldable electronic device of claim 6, wherein the hall sensor is spaced apart from the antenna contacts to reduce any interference to a signal received through the lateral conductive portion.

11. The foldable electronic device of claim 1, further comprising:
third magnets and fourth magnets, configured to maintain the folded state of the foldable electronic device through an attractive magnetic force between the third magnets and the fourth magnets,
wherein the first housing part includes:
   a first periphery portion; and
   a second periphery portion substantially perpendicular to the first periphery portion, wherein the first periphery portion of the first housing part and the second periphery portion join each other at the first corner area,
wherein the second housing part includes:
   a third periphery portion extending from the first periphery portion of the first housing part; and
   a fourth periphery portion substantially perpendicular to the third periphery portion of the second housing part, wherein the third periphery portion of the second housing part and the fourth periphery portion of the second housing part join each other at the second corner area, wherein the third magnets are disposed along the second periphery portion of the first housing part, wherein the fourth magnets are disposed along the fourth periphery portion of the second housing part, and wherein the hall sensor is closer to the first magnet than the third magnets.

12. The foldable electronic device of claim 11, wherein the hall sensor is spaced apart from the third magnets such that whether the state of the foldable electronic device corresponds to the unfolded state of the foldable electronic device or the folded state of the foldable electronic device can be identified independently of changes in a magnetic field from the third magnets and the fourth magnets caused according to change from the unfolded state of the foldable electronic device to the folded state of the foldable electronic device.

13. The foldable electronic device of claim 1, further comprising:
at least one processor, comprising processing circuitry, configured to identify based on data from the hall sensor the unfolded state of the foldable electronic device and the folded state of the foldable electronic device.

14. A foldable electronic device comprising:
a housing including:
a first housing part, and
a second housing part rotatably coupled with the first housing part;
a flexible display;
a first magnet disposed under a first corner area of the flexible display that is positioned on the first housing part;
a second magnet disposed under a second corner area of the flexible display that is positioned on the second housing part and overlaps the first corner area of the flexible display in a folded state of the foldable electronic device, wherein the first magnet and the second magnet are configured to maintain the folded state of the foldable electronic device based on an attractive magnetic force between the first magnet and the second magnet;
a first camera disposed in the first housing part;
a second camera, configured for an optical image stabilization (OIS), disposed in the first housing part; and
a hall sensor, disposed in the second housing part, configured to obtain data for identifying whether a state of the foldable electronic device corresponds to an unfolded state of the foldable electronic device or the folded state of the foldable electronic device based on a magnetic field to be caused by the first magnet and the second magnet,
wherein the hall sensor is closer to the first camera projected onto the second housing part in the folded state of the foldable electronic device than the second camara projected onto the second housing part in the folded state of the foldable electronic device.

15. The foldable electronic device of claim 14, wherein the second housing part includes:
a first periphery portion substantially perpendicular to an axis of the second housing part for rotating with respect to the first housing part; and
a second periphery portion, substantially perpendicular to the first periphery portion, substantially parallel to the axis, wherein the first periphery portion of the second housing part and the second periphery portion of the second housing part join each other at the second corner area, wherein the hall sensor is disposed between the first periphery portion of the second housing part and a virtual line extending a periphery portion of the second camera projected onto the second housing part in the folded state of the foldable electronic device, wherein the periphery portion of the second camera projected onto the second housing part in the folded state of the foldable electronic device is:
substantially parallel to the first periphery portion of the second housing part; and
closer to the first periphery portion of the second housing part than another periphery portion of the second camera projected onto the second housing part in the folded state of the foldable electronic device being substantially parallel to the first periphery portion of the second housing part.

16. The foldable electronic device of claim 15, wherein the hall sensor is disposed between the first periphery portion of the second housing part and a virtual line extending a periphery portion of the first camera projected onto the second housing part in the folded state of the foldable electronic device,
wherein the periphery portion of the first camera projected onto the second housing part in the folded state of the foldable electronic device is:
substantially parallel to the first periphery portion of the second housing part; and
closer to the first periphery portion of the second housing part than another periphery portion of the first camera projected onto the second housing part in the folded state of the foldable electronic device being substantially parallel to the first periphery portion of the second housing part.

17. The foldable electronic device of claim 16, wherein the first camera comprises an ultrawide-angle camera, and wherein the second camera comprises a wide-angle camera.

18. The foldable electronic device of claim 14, further comprising:
a first printed circuit board (PCB) disposed in the first housing part; and
a second PCB disposed in the second housing part,
wherein the first camera and the second camera are attached to the first PCB to face in a first direction, and
wherein the hall sensor is mounted on a side of the second PCB facing in a second direction opposite to the first direction.

19. The foldable electronic device of claim 18, wherein the second housing part includes:
a first periphery portion substantially perpendicular to an axis of the second housing part rotating with respect to the first housing part; and
a second periphery portion, substantially perpendicular to the first periphery portion, substantially parallel to the axis, wherein the first periphery portion of the second housing part and the second periphery portion of the second housing part join each other at the second corner area,
wherein the foldable electronic device further comprises antenna contacts, spaced apart from each other, disposed along the first periphery portion of the second housing part,
wherein the first periphery portion of the second housing part includes a lateral conductive portion configured to function as an antenna,
wherein each of the antenna contacts is contacted on both the second PCB and the lateral conductive portion included in the first periphery portion of the second housing part to connect the second PCB to the lateral conductive portion included in the first periphery portion of the second housing part, and wherein the hall sensor is spaced apart from each of the antenna contacts.

20. The foldable electronic device of claim 19, wherein the antenna contacts are disposed on another side of the second PCB that is opposite to the side of the PCB on which the hall sensor is mounted.

\* \* \* \* \*